US012305308B2

(12) United States Patent
Agarwal et al.

(10) Patent No.: US 12,305,308 B2
(45) Date of Patent: May 20, 2025

(54) COATING SYSTEM AND METHOD FOR E-COATING AND DEGASIFICATION OF E-COAT FLUID DURING E-COAT

(71) Applicant: Tesla, Inc., Austin, TX (US)

(72) Inventors: Gunjan Agarwal, Mountain View, CA (US); Sundaresan Avudaiappan, Sunnyvale, CA (US); Christopher Lillywhite, Pleasanton, CA (US)

(73) Assignee: Tesla, Inc., Austin, TX (US)

( * ) Notice: Subject to any disclaimer, the term of this patent is extended or adjusted under 35 U.S.C. 154(b) by 64 days.

(21) Appl. No.: 18/319,130

(22) Filed: May 17, 2023

(65) Prior Publication Data

US 2023/0287592 A1 Sep. 14, 2023

Related U.S. Application Data

(62) Division of application No. 16/769,211, filed as application No. PCT/IB2018/059780 on Dec. 7, 2018, now Pat. No. 11,692,278.

(Continued)

(51) Int. Cl.
*C25D 5/20* (2006.01)
*B05D 7/16* (2006.01)

(Continued)

(52) U.S. Cl.
CPC ................. *C25D 5/20* (2013.01); *B05D 7/16* (2013.01); *C25D 3/02* (2013.01); *C25D 7/00* (2013.01); *C25D 13/22* (2013.01); *C25D 21/12* (2013.01)

(58) Field of Classification Search
None
See application file for complete search history.

(56) References Cited

U.S. PATENT DOCUMENTS 4,772,374 A 9/1988 Urquhart et al.
5,200,666 A 4/1993 Walter et al.

(Continued)

FOREIGN PATENT DOCUMENTS

EP 0326021 8/1989
JP S55100999 8/1980

(Continued)

OTHER PUBLICATIONS

"International Application Serial No. PCT IB2018 059780, International Search Report mailed Mar. 14, 2019", 3 pgs.

(Continued)

*Primary Examiner* — Louis J Rufo
(74) *Attorney, Agent, or Firm* — Schwegman Lundberg & Woessner, P.A.

(57) ABSTRACT

A coating system includes an electrocoat (e-coat) bath having an e-coat fluid with a first amount of dissolved gases, a plurality of ultrasonic transducers mounted on at least two sides of the e-coat bath, a carrier frame and control circuitry. The control circuitry is configured to control a trajectory of a metal part dipped in the e-coat bath using the carrier frame, control the plurality of ultrasonic transducers to direct a plurality of acoustic waves at a defined ultrasonic operating frequency and at a first intensity to cause a plurality of localized pressure drops in the e-coat fluid, the first amount of dissolved gases is reduced or removed as bubbles from the e-coat fluid of the e-coat bath based on the directed plurality of acoustic waves, and increase the first intensity of the directed plurality of acoustic waves over a defined time period to accelerate dispersion of an e-coat pigment.

16 Claims, 15 Drawing Sheets

Related U.S. Application Data

(60) Provisional application No. 62/595,791, filed on Dec. 7, 2017.

(51) Int. Cl.

| | |
|---|---|
| ***C25D 3/02*** | (2006.01) |
| ***C25D 7/00*** | (2006.01) |
| ***C25D 13/22*** | (2006.01) |
| ***C25D 21/12*** | (2006.01) |

(56) References Cited

U.S. PATENT DOCUMENTS

| | | | | |
|---|---|---|---|---|
| 6,368,482 | B1 | 4/2002 | Oeftering et al. | |
| 6,746,590 | B2 | 6/2004 | Zhang et al. | |
| 7,081,164 | B2 | 7/2006 | Kyotani | |
| 9,102,553 | B2 | 8/2015 | De Meulenaer et al. | |
| 10,604,860 | B2 | 3/2020 | Norton et al. | |
| 11,692,278 | B2 | 7/2023 | Agarwal et al. | |
| 2001/0023828 | A1* | 9/2001 | Houziel | C25D 13/22 204/622 |
| 2003/0042145 | A1 | 3/2003 | Zhang et al. | |
| 2004/0022957 | A1 | 2/2004 | Thompson et al. | |
| 2010/0170801 | A1* | 7/2010 | Metzger | C25D 5/617 205/101 |
| 2019/0169765 | A1* | 6/2019 | Norton | B65G 35/06 |
| 2021/0172083 | A1 | 6/2021 | Agarwal et al. | |

FOREIGN PATENT DOCUMENTS

| | | |
|---|---|---|
| JP | H0987893 | 3/1997 |
| WO | 2019111229 | 6/2019 |

OTHER PUBLICATIONS

"International Application Serial No. PCT IB2018 059780, Written Opinion mailed Mar. 14, 2019", 8 pgs.
"International Application Serial No. PCT IB2018 059780, International Preliminary Report on Patentability mailed Jun. 18, 2020", 10 pgs.
"U.S. Appl. No. 16/769,211, Restriction Requirement mailed Apr. 8, 2021", 7 pgs.
"U.S. Appl. No. 16/769,211, Response filed Jul. 8, 2021 to Restriction Requirement mailed Apr. 8, 2021", 7 pgs.
"U.S. Appl. No. 16/769,211, Non Final Office Action mailed Oct. 7, 2021", 20 pgs.
"U.S. Appl. No. 16/769,211, Response filed Mar. 16, 2022 to Non Final Office Action mailed Oct. 7, 2021", 11 pgs.
"U.S. Appl. No. 16/769,211, Final Office Action mailed Jun. 17, 2022", 16 pgs.
"English Translation JP55100999", (1980), 1 pg.
"U.S. Appl. No. 16/769,211, Response filed Oct. 17, 2022 to Final Office Action mailed Jun. 17, 2022", 12 pgs.
"U.S. Appl. No. 16/769,211, Non Final Office Action mailed Mar. 3, 2023", 8 pgs.
"English translation WO2016114497", (2016), 48 pgs.
"English translation CN 106119932", (2016), 12 pgs.
"U.S. Appl. No. 16/769,211, Response filed Mar. 21, 2023 to Non Final Office Action mailed Mar. 3, 2023", 9 pgs.
"U.S. Appl. No. 16/769,211, Notice of Allowance mailed Apr. 14, 2023", 10 pgs.
Awad, S. B, "Ultrasonics in Cleaning and Electroplating", (2000), 7 pgs.
Rooze, Joost, "Dissolved gas and ultrasonic cavitation—a review", Ultrasonics Sonochemistry 20, (2013), 1-11.

* cited by examiner

700A

700B

COATING SYSTEM AND METHOD FOR E-COATING AND DEGASIFICATION OF E-COAT FLUID DURING E-COAT

INCORPORATION BY REFERENCE TO ANY PRIORITY APPLICATIONS

Any and all applications for which a foreign or domestic priority claim is identified in the Application Data Sheet or PCT Request as filed with the present application are hereby incorporated by reference under 37 CFR 1.57, and Rules 4.18 and 20.6. The present application is a divisional of U.S. application Ser. No. 16/769,211, filed Jun. 2, 2020, which claims priority to PCT App. No. PCT/IB2018/059780, filed Dec. 7, 2018, which claims priority to U.S. Provisional App. No. 62/595,791, filed Dec. 7, 2017, each of which are hereby incorporated by reference in their entirety.

BACKGROUND

Field

Various embodiments of the disclosure relate to coating technologies for vehicles. More specifically, various embodiments of the disclosure relate to energy efficient electrocoating (e-coating) and degasification of electrocoat e-coat fluid during e-coat of complex metal parts of a vehicle for enhanced binding of paint coat to the complex metal parts of the vehicle.

Description of the Related Art

With the advancements in the field of coating technologies, various processes to coat complex metal parts have been adopted in recent years at an industrial scale in the vehicle production pipeline. The e-coat process may be considered a combination of electroplating and painting, where a metal part is immersed in an e-coat fluid containing resin and binder. Conventional e-coat processes are time-consuming, susceptible to hydrogen-gas formation, and often require additional resin and binder added to the mixture when the component settles to the bottom of the bath. Thus, an e-coating system and method that overcomes these drawbacks is desired.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A coating system and method for e-coating and degasification of high-viscosity coating fluid during e-coat is substantially shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed coating system and method for degasification of a coating fluid during electrocoat (e-coat). The disclosed coating system includes an e-coat bath that is filled with an e-coat fluid. The coating system further includes a plurality of ultrasonic transducers that are suitably positioned in the e-coat bath in a zone-of-interest. A plurality of acoustic waves from the plurality of ultrasonic transducers are directed in the zone-of-interest within the e-coat bath when a metal part of a vehicle is dipped in the e-coat fluid within the e-coat bath. The plurality of acoustic waves are directed at a defined ultrasonic operating frequency and at a first intensity in the zone-of-interest such that removal of gases, such as hydrogen gas, from the e-coat fluid is significantly accelerated during e-coat of the metal part of the vehicle. The application of the plurality of acoustic waves at the defined ultrasonic operating frequency accelerates the reaction time, decreasing the time to form the e-coat. It also removes trapped air bubbles or air pockets around the complex metal part, such as a vehicle body, thereby increasing the e-coat surface finish and ultimately the final paint finish.

Further, in conventional systems, the e-coat pigment or resin particles present in the e-coat fluid typically settle at the bottom of the e-coat bath after a certain time period both during e-coat and after e-coat. The sedimentation of such e-coat pigment or resin particles at the bottom of the e-coat bath increases the maintenance of the bath at the required proportions of resin, binder, and water, and also increases the cleaning effort of the e-coating bath. This adversely impacts the throughput and overall turn-around-time in vehicle production. The disclosed coating system reduces sedimentation of the e-coat pigment and resin at the bottom of the e-coat bath, leaving the bottom surface of the e-coat bath cleaner and requiring less maintenance time. The disclosed coating system also decreases the time needed to e-coat a vehicle or vehicle part.

Figure 1:
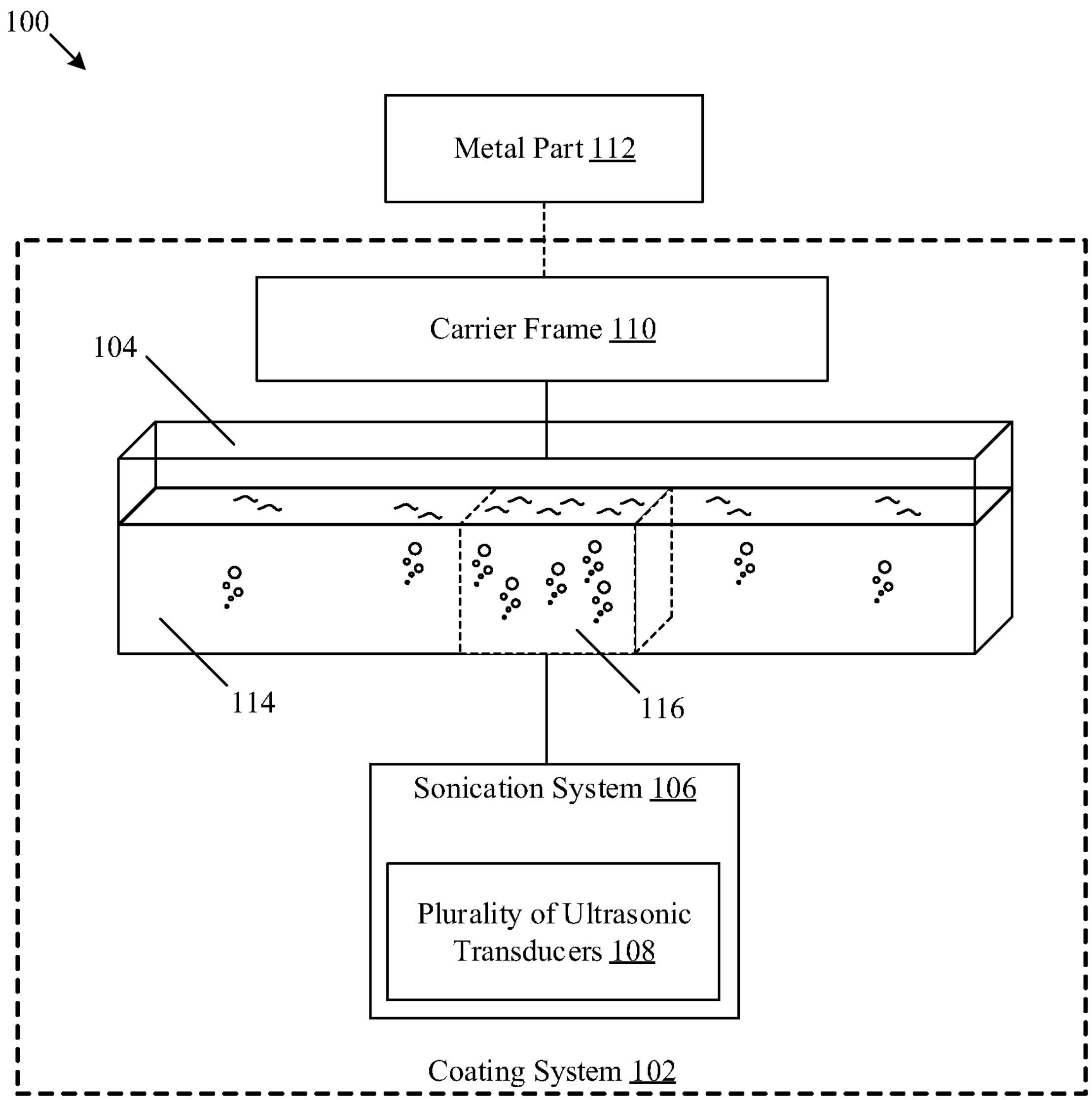
FIG. 1 illustrates an operational environment of a coating system for e-coat and degasification of a coating fluid during e-coat, in accordance with an embodiment of the disclosure.

FIG. 1 illustrates an operational environment of a coating system for e-coat and degasification of a coating fluid during e-coat, in accordance with an embodiment of the disclosure. With reference to FIG. 1, there is shown an operational environment 100 for a coating system 102. The coating system 102 may include an e-coat tank 104 and a sonication system 106. The sonication system 106 may include a plurality of ultrasonic transducers 108 suitably within or outside of the e-coat tank 104. There is further shown a carrier frame 110 and a metal part 112 that may be mounted on the carrier frame 110. The metal part 112 may be a single metal component of a vehicle or an assembly of metal components of the vehicle. The e-coat tank 104 may store an e-coat fluid solution 114 in which the metal part 112 may be immersed to deposit an e-coat layer on the metal part 112.

The coating system 102 may comprise suitable logic, circuitry, and interfaces that may be configured to control different parameters associated with a degasification of dissolved gases from e-coat fluid solution 114 and a deposition of the e-coat layer on the metal part 112 of the vehicle. For example, the parameters may be a temperature of the e-coat fluid solution 114, an acoustic intensity, and an ultrasonic frequency of acoustic waves. The coating system 102 may be a centralized or a decentralized system with different system components, such as the sonication system 106, operational in accordance with control signals from a dedicated control device or a distributed network of control devices. For example, the dedicated control device may be a local server for a paint unit in a manufacturing and/or assembling plant for vehicles or vehicle components.

The e-coat tank 104 may be a storage tank for storage of the e-coat fluid solution 114. The e-coat tank 104 may include a network of pipes and fluid eductors that may be used to fill up the e-coat tank 104 and/or remove the e-coat fluid solution 114 from the e-coat tank 104. The e-coat tank 104 may further include different components, such as electrodes, temperature sensors, and heat exchangers, to monitor and control electrophoretic coating (as part of electrophoretic deposition (EPD) in a painting process of a paint unit of the manufacturing and/or assembling plant) on the metal part 112. The e-coat tank 104 may be made of stainless steel or a suitable material that may be resistant to acoustic pressure and/or chemical degradation from acoustic waves and the e-coating process.

The sonication system 106 may be configured to generate a plurality of acoustic waves at an ultrasonic frequency (or different ultrasonic frequencies) and with an acoustic intensity (or different acoustic intensities). The sonication system 106 may include the plurality of ultrasonic transducers 108. The plurality of ultrasonic transducers 108 may operate when immersed in liquid, such as the e-coat fluid solution 114. In some embodiments, an ultrasonic frequency generator may be integrated with each of the plurality of ultrasonic transducers 108. Alternatively, the ultrasonic frequency generator may be a separate device connected to each of the plurality of ultrasonic transducers 108.

The sonication system 106 may be an electronically-controlled acoustic source that includes the plurality of ultrasonic transducers 108 within a zone-of-interest 116. The zone-of-interest 116 may correspond to a maximum gassing region in the e-coat tank 104, where a maximum amount of dissolved gases are present. The zone-of-interest 116 in the e-coat tank 104 may also correspond to an active reaction zone in which maximum gas build-up in the e-coat fluid is observed during the e-coat process. In certain embodiments, the zone-of-interest 116 may extend to substantially the length of the e-coat tank 104.

The plurality of ultrasonic transducers 108 may be mounted at a bottom portion the e-coat tank 104. The placement of the plurality of ultrasonic transducers 108 may be based on a size, a shape, or a structure of the metal part 112 to be e-coated and the capacity or volume of the e-coat tank 104. Alternatively stated, the placement of the plurality of ultrasonic transducers 108 within the e-coat tank 104 may be based on several factors, such as the volume of the e-coat fluid in the e-coat tank 104, a geometric layout of the e-coat tank 104, and different load sizes of the parts of the ultrasonic transducers or other parts installed in the e-coat tank 104. Also, the plurality of ultrasonic transducers 108 may be at the bottom portion of e-coat tank 104 such that a plurality of acoustic waves from the plurality of ultrasonic transducers 108 is directed uniformly in different directions throughout a volume of the e-coat fluid solution 114 in the zone-of-interest 116.

The plurality of ultrasonic transducers 108 may be immersible ultrasonic transducers mounted in the e-coat tank 104 such that omnidirectional acoustic waves are directed throughout the volume of the e-coat fluid solution 114 in the zone-of-interest 116. The plurality of ultrasonic transducers 108 may be placed at the bottom level to have a smoother pressure build-up from omnidirectional radiation, as compared to larger spatial non-uniformities in pressure from a conventional unidirectional radiation. Also, the plurality of ultrasonic transducers 108 may be at the bottom level to ensure that a surface of the metal part 112 immersed in the e-coat fluid solution 114 is in a direct acoustic range of the plurality of ultrasonic transducers 108. Also, the acoustic pressure from the directed acoustic waves may cause acoustic cavitation in different regions within a volume of the e-coat fluid solution 114 that corresponds to the zone-of-interest 116. The acoustic cavitation may lead to a controlled and uniform degassing of the e-coat solution in the zone-of-interest 116.

In certain embodiments, at least one of the plurality of ultrasonic transducers 108 may be a non-immersible ultrasonic transducer mounted on the bottom of the e-coat tank 104 from outside. The non-immersible ultrasonic transducer may be also mounted on sides of the e-coat tank 104. The non-immersible ultrasonic transducer may be mounted on the bottom of the e-coat tank 104 in a contained layer, so as to not come into contact with the e-coat fluid solution 114 in the e-coat tank 104. Alternatively, instead of mounting the non-immersible ultrasonic transducer on the bottom of the e-coat tank 104 in a contained layer, they are instead mounted on the inside of the e-coat tank 104 but above a level of the e-coat fluid solution 114. This may be preferred to effectively remove gas build-up on the metal part 112, i.e. entrapped bubbles on the e-coat layer. The bottom or side mount of the plurality of ultrasonic transducers 108 may reduce certain debris and foreign material which may settle on the top of each of the plurality of ultrasonic transducers 108. Conventionally, the debris and foreign material when settled on the top of each the plurality of ultrasonic transducers 108 usually reduces the effectiveness or performance of the sonication system 106.

The carrier frame 110 may be an electronically steerable assembly that may have one or more support portions to support and hold onto the metal part 112 of the vehicle. The carrier frame 110 may include guide rails that may be mounted on top of the e-coat tank 104. The metal part 112 may be mounted as a carriage on the guide rails of the carrier frame 110. The height and horizontal displacement of the metal part 112 from the carrier frame 110 may be adjusted at different points along the length of the e-coat tank 104.

The e-coat fluid solution 114 may include of an e-coat pigment, a resin, and a deionized (DI) water. Alternatively, the e-coat fluid solution 114 may have a different composition under a different proportion for different types of metal parts of the vehicle. The e-coat pigment and the resin may be mixed with the deionized water to form the e-coat fluid solution 114.

In operation, the metal part 112 may undergo a pre-treatment process before the metal part 112 undergoes the e-coating process. The pre-treatment process may ensure that the metal part 112 remains clean and prepared for the e-coating process. Also, the pre-treatment process may prevent bubbles in the e-coat tank 104 to adhere to the metal part 112 while the metal part 112 is immersed in the e-coat tank 104. The pre-treatment process may include, but is not limited to, a cleanup of the metal part 112 by cleaner solutions, such as an alkaline cleaner, a rinse operation, an acid etch, and a dip in a wetting agent.

The pre-treated metal part (also referred to the metal part 112) may be moved for immersion in the e-coat tank 104. Also, prior to an initialization of the e-coat process, the e-coat tank 104 may be filled with the e-coat fluid solution 114. The coating system 102 may be configured to use fluid eductors and the network of pipes in the e-coat tank 104 to automatically pour the e-coat tank 104 with a pre-determined volume of the e-coat fluid solution 114 to a pre-determined level of the e-coat tank 104. The coating system 102 may be configured to monitor a temperature and other parameters, such as pH, and viscosity, to ensure that the e-coat fluid solution 114 has achieved conditions that is required (optimum) for the e-coat process.

In the e-coat tank 104, the e-coat fluid solution 114 may include a first amount of dissolved gases, such as hydrogen (H2) gas. The dissolved gases and associated effects on a deposition of an e-coat pigment on the metal part 112 may be maximum within the zone-of-interest 116. Conventionally, as the metal part 112 is immersed in the zone-of-interest 116, the dissolved gas may prevent the e-coat pigment or the paint emulsion in the e-coat fluid solution 114 to condense evenly on different regions of the metal part 112. In such cases, the e-coat pigment on the metal part 112 may deposit such that there may be localized regions on the metal part 112 where the e-coat pigment may not have condensed suitably, and thereby leads to coating defects in the metal part 112 (i.e. an e-coated metal part).

In order to prevent such defects, a process of a controlled acoustic cavitation may be implemented in the zone-of-interest 116. The controlled acoustic cavitation may cause a development of positive and negative pressure regions that may lead to generation of vacuum bubbles that may entrap a portion of the dissolved gases. The entrapped portion of the dissolved gases in the bubbles may rise to the surface of the e-coat fluid solution 114, coalesce, and implode to release the entrapped portion of the dissolved gases from the e-coat fluid solution 114. This process may be referred to as a controlled degasification of the first amount of the dissolved gases over a defined time period. This process may ensure that the deposition of the e-coat pigment or the paint emulsion is uniformly applied onto the surface of the metal part 112.

The coating system 102 may be configured to control the plurality of ultrasonic transducers 108 (immersed in the zone-of-interest 116) to direct a plurality of acoustic waves at an ultrasonic frequency in the zone-of-interest 116 of the e-coat tank 104. The directed plurality of acoustic waves at the ultrasonic frequency may cause the controlled degasification of the first amount of the dissolved gases from a volume of the e-coat fluid solution 114 that corresponds to the zone-of-interest 116. The coating system 102 may be further configured to control a first intensity of the directed plurality of acoustic waves over the defined time period for a control over the deposition of the e-coat pigment over the metal part 112 of the vehicle. The metal part 112 may be immersed in the e-coat fluid solution 114 at a specific height from a bottom level of the e-coat tank 104. The specific height may be decided based on an acoustic range of the plurality of ultrasonic transducers 108, an angle of incidence on the surface of the metal part 112, a smoothness of buildup of pressure near the surface of the metal part 112, spatial and time-dependent pressure variations on the surface of the metal part 112, and other factors.

Figure 2:
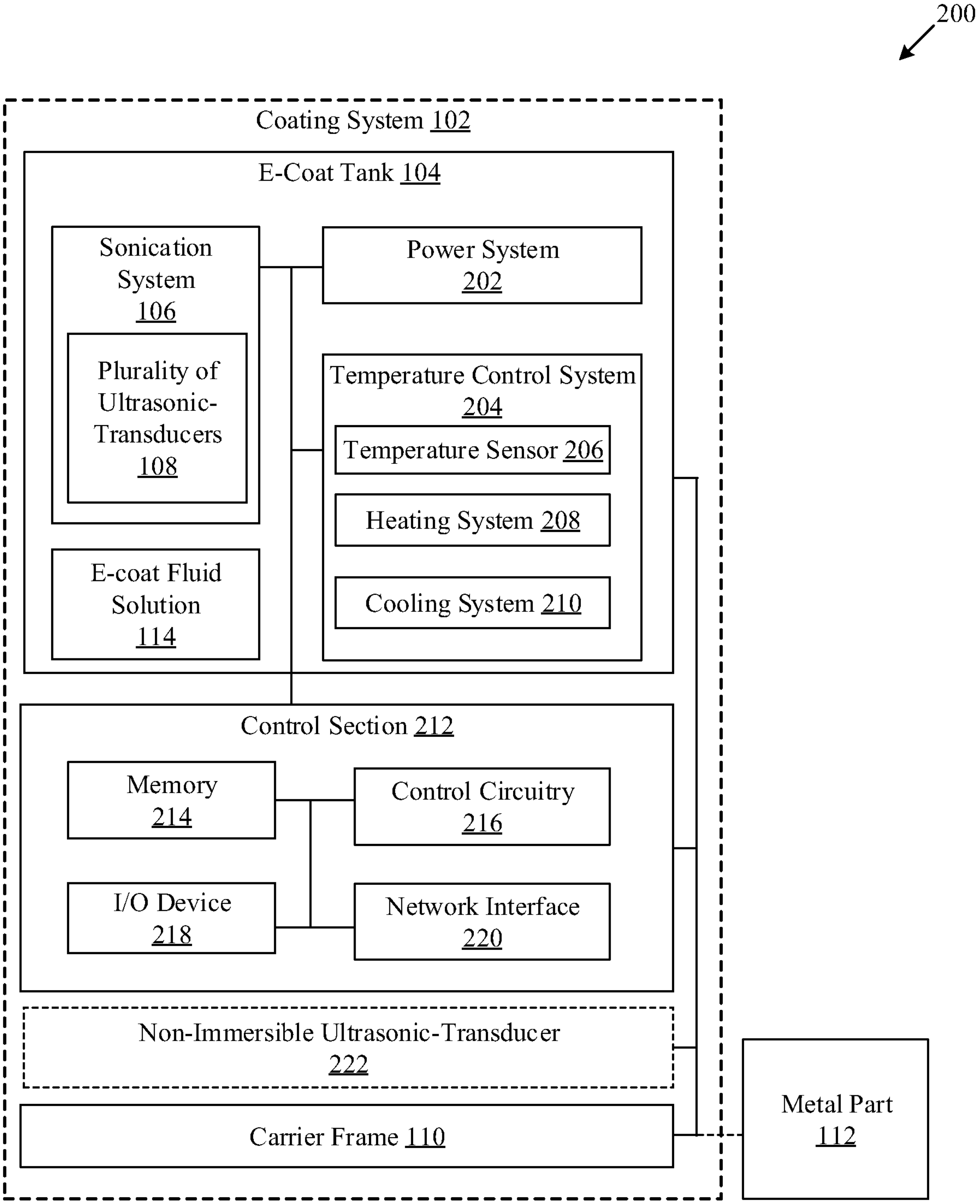
FIG. 2 is a block diagram that illustrates various exemplary components or systems of the coating system of FIG. 1, in accordance with an embodiment of the disclosure.

FIG. 2 is a block diagram that illustrates various exemplary components or systems of the coating system of FIG. 1, in accordance with an embodiment of the disclosure. FIG. 2 is explained in conjunction with elements from FIG. 1. With reference to FIG. 2, there is shown the coating system 102. The coating system 102 may include the sonication system 106, a power system 202, and a temperature control system 204. The temperature control system 204 may include a temperature sensor 206, a heating system 208, and a cooling system 210. The e-coat tank 104 may store the e-coat fluid solution 114. The coating system 102 may further include a control section 212 and the carrier frame 110 associated with the e-coat tank 104. The control section 212 may include a memory 214, control circuitry 216, an input/output (I/O) device 218, and a network interface 220. In some embodiments, the coating system 102 may also include one or more non-immersible ultrasonic transducers, such as a non-immersible ultrasonic transducer 222.

The power system 202 may supply power to various components of the coating system 102. Further, the power system 202 may regulate supply of electric current or voltage to various components in the e-coat tank 104. When a metal part (such as a vehicle body) is dipped in three-coat fluid solution 114 of the e-coat tank 104 from an overhead conveyor or shuttle (such as the carrier frame 110), the vehicle body may act as a cathode and one or more plates within the e-coat tank 104 may act as the anode. The control section 212 may be configured to electronically control the power system 202 based on a set of control signals over the defined time period of the e-coating process.

The temperature control system 204 may include the temperature sensor 206, the heating system 208, and the cooling system 210. The temperature control system 204 may comprise suitable logic, circuitry, and interfaces that may be configured to continuously monitor temperature levels within the e-coat tank 104 using the temperature sensor 206. The heating system 208 and the cooling system 210 may comprise suitable logic, circuitry, and interfaces that may be configured to receive control signals from the control circuitry 216 to regulate the temperature within the e-coat tank 104 in a specified temperature range for the e-coating process. In cases where the temperature within the e-coat tank 104 reaches beyond a specified temperature threshold, a temperature alarm may be raised, and the cooling system 210 may be activated to cool down the e-coat fluid solution 114 in the e-coat tank 104. The heating system 208 may be used to heat the e-coat fluid solution 114 in the e-coat tank 104 for a time period such that temperature of the e-coat fluid solution 114 is between a specified temperature range, such as "70° F." to "95° F.". Electrical resistance during from electrophoretic deposition, friction of free radicals in the e-coat fluid solution 114, and acoustic cavitation caused by acoustic signals may be the major factors that may be causing a rise in the temperature of the e-coat fluid solution 114. In some embodiments, one or more heat exchangers may be used to manage high temperatures resulting from electrophoretic deposition, i.e. during the e-coat process. The heat exchanger may enable an optimal control of the temperature during the controlled degasification of the e-coat fluid solution 114.

The control section 212 may include the memory 214, the control circuitry 216, the I/O device 218, and the network interface 220. In some embodiments, the control section 212 may be provided or integrated on the outer periphery of the e-coat tank 104. In some embodiments, the control section 212 may be a separate device communicatively coupled to the various components, such as the sonication system 106, the power system 202, and the temperature control system 204, of the coating system 102.

For example, the operations of the control section 212 may be implemented on at least one of a cloud server, a local server in the manufacturing and/or assembling plant for painting operations, a distributed control system (DCS), an industrial control system (such as a Programmable Logic Controller (PLC), a Supervisory Control and Data Acquisition (SCADA), or a Proportional-Integral-Derivative (PID) controller), or a combination thereof.

The memory 214 may comprise suitable logic, circuitry, and/or interfaces that may be configured to store a set of instructions executable by the control circuitry 216. For example, different settings and configurations to control a trajectory of the metal part 112 of the vehicle within the e-coat tank 104 may be stored in the memory 214. Examples of implementation of the memory 214 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory.

The control circuitry 216 may comprise suitable logic, circuits, interfaces, and/or code that may be configured to automatically (i.e. programmatically) control one or more components or systems, such as the sonication system 106, the power system 202, and the temperature control system 204, of the coating system 102. Examples of the control circuitry 216 may include, but are not limited to, a micro-controller, a Reduced Instruction Set Computing (RISC) processor, an Application-Specific Integrated Circuit (ASIC) processor, a Complex Instruction Set Computing (CISC) processor, a microcontroller, a central processing unit (CPU), a state machine, and/or other processors or control circuits.

The I/O device 218 may comprise suitable logic, circuitry, interfaces, and/or code that may be configured to receive the one or more user inputs and provide one or more corresponding outputs to a user who may manage the operations associated with the e-coat process. Examples of the input devices may include, but are not limited to, a touch screen, a microphone, a human machine interface (HMI) for the e-coat process, a motion sensor, a keyboard, or a dedicated user interface. Examples of the output devices may include, but are not limited to, a display, a temperature alarm bell, or a speaker.

The network interface 220 may comprise suitable logic, circuitry, interfaces, and/or code that may be configured to communicate with other components and systems of the coating system 102, via a wired or wireless communication channel. The network interface 220 may be implemented by application of known technologies to support wired or wireless communication among different components of the coating system 102 and other devices in and around the vehicle manufacturing and/or assembling plant.

The non-immersible ultrasonic transducer 222 may be a stepped-plate high-directional transducer or a push pull ultrasonic transducer. The non-immersible ultrasonic transducer 222 may include one or more radiating plates, which may generate acoustic waves at an ultrasonic frequency, for example, "25 kHz". In some embodiments, the non-immersible ultrasonic transducer 222 may also be provided in the coating system 102 in addition to the plurality of ultrasonic transducers 108. The non-immersible ultrasonic transducer 222 may be configured to output a highly directional acoustic wave to rupture a plurality of bubbles semi-submerged within a coating layer formed on the metal part 112 of the vehicle. The non-immersible ultrasonic transducer 222 may be activated based on control signal(s) received from the control circuitry 216.

Figure 3A:
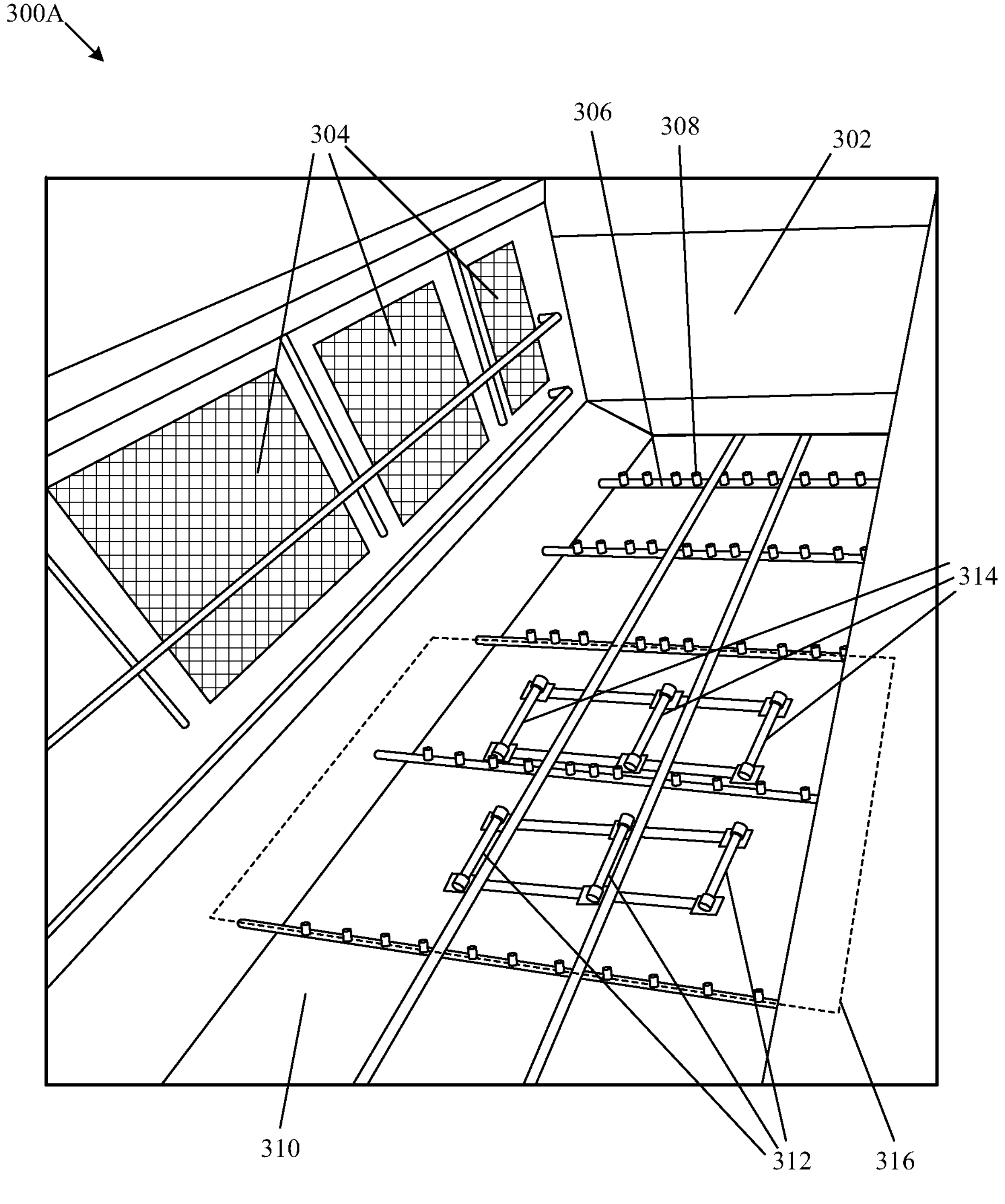
FIG. 3A illustrates a view of an exemplary e-coat tank for e-coat and degasification of a coating fluid during e-coat, in accordance with an embodiment of the disclosure.

FIG. 3A illustrates a view of an exemplary e-coat tank for e-coat and degasification of a coating fluid during e-coat, in accordance with an embodiment of the disclosure. FIG. 3A is explained in conjunction with elements from FIGS. 1 and 2. In FIG. 3A, there is shown a view 300A of an e-coat tank 302. The e-coat tank 302 may be same as the e-coat tank 104. The e-coat tank 302 includes a plurality of anode panels 304 on side walls of the e-coat tank 302. The e-coat tank 302 further includes a network of pipes 306 and a network of fluid eductors 308 at a bottom portion 310 of the e-coat tank 302. There is further shown a plurality of ultrasonic transducers, such as a first set of ultrasonic transducers 312 and a second set of ultrasonic transducers 314 in a zone-of-interest 316 of the e-coat tank 302. Although not shown, there may be watertight (i.e. insulated and grounded) cables routed along walls and in between the plurality of anode panels 304 of the e-coat tank 302. Such cables may power the first set of ultrasonic transducers 312 and the second set of ultrasonic transducers 314 in the zone-of-interest 316.

In the e-coat tank 302, the first set of ultrasonic transducers 312 and the second set of ultrasonic transducers 314 may be mounted to the bottom portion 310 of the e-coat tank 302 and within the zone-of-interest 316. Each of the first set of ultrasonic transducers 312 and the second set of ultrasonic transducers 314 may be configured to generate omnidirectional acoustic waves as the corresponding ultrasonic transducer resonates at a high wave amplitude. The generated omnidirectional acoustic waves may correspond to cyclic positive pressure waves and negative pressure waves within the e-coat fluid solution 114 at an ultrasonic frequency, for example, "25 kHz". The details of the first set of ultrasonic transducers 312 and the second set of ultrasonic transducers 314 is described, for example, in FIGS. 3B and 3C.

Figure 3B:
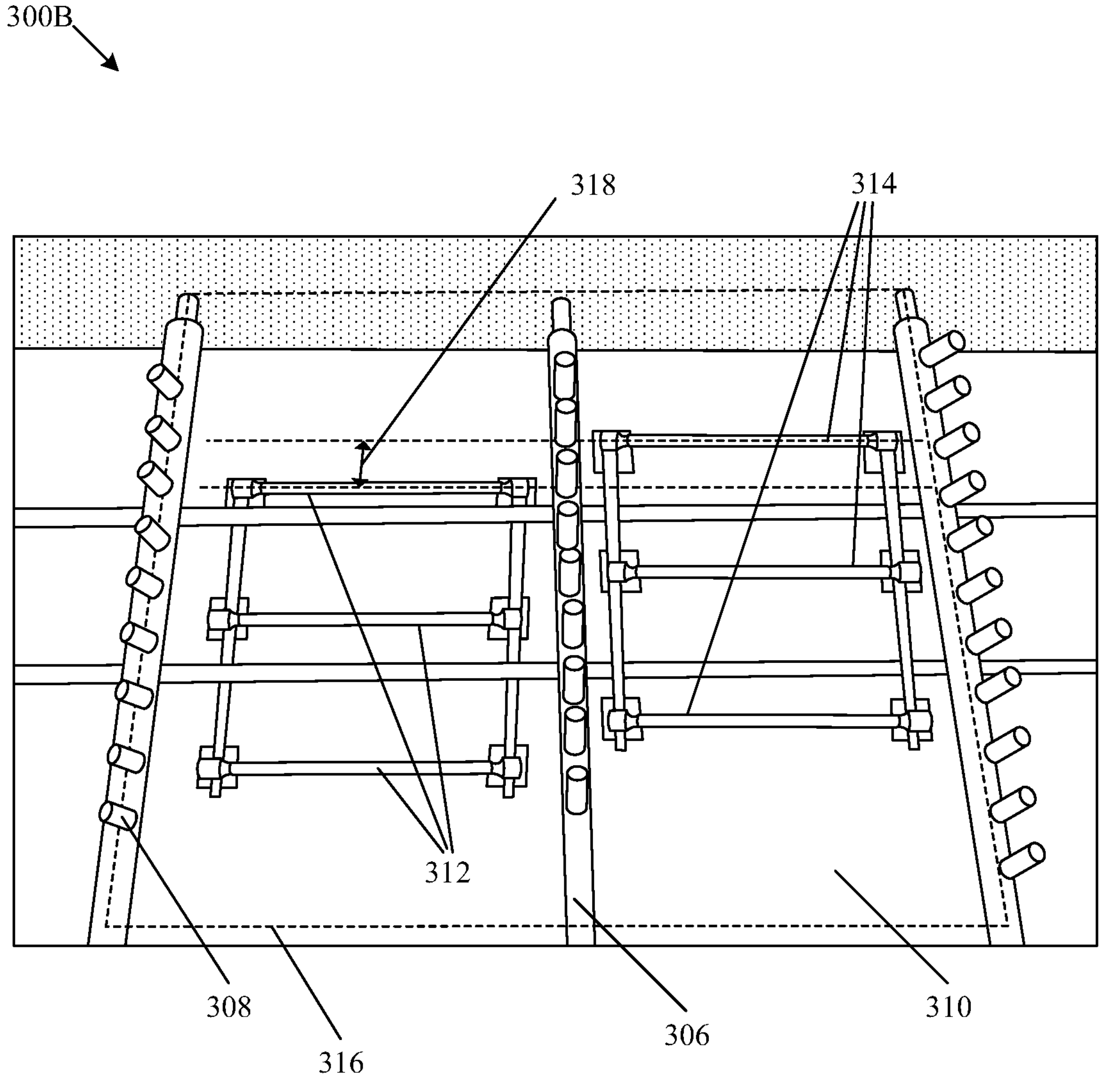
FIG. 3B illustrates an enlarged view of a zone-of-interest in the e-coat tank of FIG. 3A, in accordance with an embodiment of the disclosure.

FIG. 3B illustrates an enlarged view of a zone-of-interest in the e-coat tank of FIG. 3A, in accordance with an embodiment of the disclosure. FIG. 3B is explained in conjunction with elements from FIGS. 1, 2, and 3A. With reference to FIG. 3B, there is shown an enlarged view 300B of the zone-of-interest 316 of the e-coat tank 302.

In the enlarged view 300B, the first set of ultrasonic transducers 312 and the second set of ultrasonic transducers 314 may be mounted on the bottom portion 310 of the e-coat tank 302 in the zone-of-interest 316 such that a first position of the first set of ultrasonic transducers 312 staggers from a second position of the second set of ultrasonic transducers 314. The stagger in the first position and the second position may be represented by a distance 318. The first position may stagger from the second position for an inhibition of at least one dead fluid zone in the zone-of-interest 316. In other words, the stagger in the first position and the second position may help to minimize a development of at least one dead fluid zone in the e-coat fluid solution 114. The dead fluid zone may correspond to a specific volume of the e-coat fluid solution 114 which remains unaffected by the acoustic energy generated by the first set of ultrasonic transducers 312 and the second set of ultrasonic transducers 314. Also, a minimum effect of the degasification and acoustic cavitation (i.e. a release of the dissolved gases from implosion of bubbles at surfaces) may be observed in the dead fluid zone.

In certain embodiments, each of the first set of ultrasonic transducers 312 and the second set of ultrasonic transducers 314 may be a push-pull ultrasonic transducer, with a free vibrating end and a fixed end. The free vibrating end may be mounted on a support mounting bracket (not shown). Similarly, the fixed end may be mounted on a fixed bracket (not shown). The entire fixture that includes the first set of ultrasonic transducers 312 and the second set of ultrasonic transducers 314 may be firmly secured to an L-channel in the e-coat tank 302 with chains (not shown). Additionally, mats (not shown) may be placed below the free vibrating end and the fixed end of each of the first set of ultrasonic transducers 312 and the second set of ultrasonic transducers 314 to absorb vibrations from the acoustic energy generated from acoustic waves. The mats may be made of plastic, stainless steel, or of a suitable material that may efficiently absorb the vibrations.

Figure 3C:
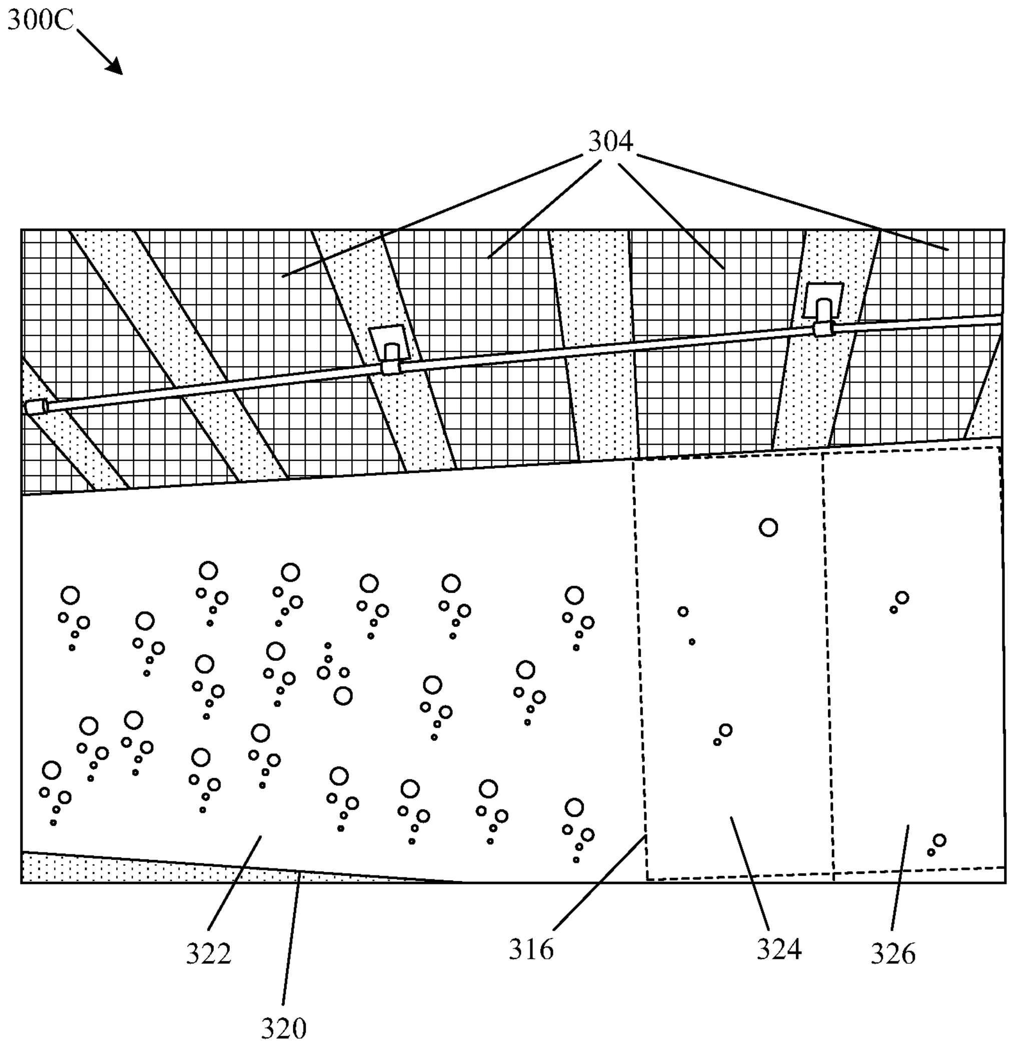
FIG. 3C illustrates a view of an exemplary e-coat tank of FIG. 3A during the e-coat process, in accordance with an embodiment of the disclosure.

FIG. 3C illustrates a view of an exemplary e-coat tank of FIG. 3A during the e-coat process, in accordance with an embodiment of the disclosure. FIG. 3C is explained in conjunction with elements from FIGS. 1, 2, 3A, and 3B. With reference to FIG. 3C, there is shown a view 300C of the e-coat tank 302 during the e-coat process. The details of the e-coat process are described herein.

Initially, the control circuitry 216 may be configured to transfer the e-coat fluid solution 114 to the e-coat tank 302, via the network of pipes 306 and the network of fluid eductors 308 at the bottom portion 310 of the e-coat tank 302. The e-coat fluid solution 114 may fill up the e-coat tank 302 up to a specific level 320 that may depend on a height of the e-coat tank 302 and an acoustic range at a specific height of the metal part 112 from the first set of ultrasonic transducers 312 and the second set of ultrasonic transducers 314.

The e-coat fluid solution 114 may include a first amount of dissolved gases (for example, a hydrogen (H2) gas) that may be at a first pressure. The solubility of a gas (i.e., the amount of dissolved gas in the e-coat fluid solution 114) may be proportional to a partial pressure of the dissolved gases. Thus, the solubility of the dissolved gases, such as the H2 gas, in the e-coat fluid solution 114 may be reduced by placing the e-coat fluid solution 114 under a reduced pressure.

In some embodiments, the control circuitry 216 may be configured to control the temperature of the e-coat fluid solution 114 within a range of temperature values that may be required for a deposition of the e-coat pigment in the e-coat fluid solution 114 on the metal part 112 of the vehicle. The e-coat fluid solution 114 in the e-coat tank 302 may be heated for a defined time period. The control circuitry 216 may be configured to communicate a first control signal to the heating system 208 to heat the e-coat fluid solution 114 in the e-coat tank 302 for the defined time period to maintain the temperature of the e-coat fluid solution 114 within the range of temperature values, such as "70° F. to 95° F.". The temperature within the e-coat tank 302 may be continuously monitored using the temperature sensor 206. In cases where the temperature reaches beyond a specified temperature threshold, for example, "95° F. or 100° F.", a temperature alarm may be raised, using the temperature alarm bell of the I/O device 218. The cooling system 210 may be activated concurrently to cool down the e-coat fluid solution 114 within the e-coat tank 302. In accordance with an embodiment, the control circuitry 216 may be configured to monitor a plurality of parameters, such as pH level of the e-coat fluid solution 114, a concentration ratio of the e-coat pigment or resin to the deionized water, and a total pressure of the dissolved gases in the e-coat fluid solution 114.

In some embodiments, the control circuitry 216 may be further configured to control an immersion of the metal part 112 to be e-coated in the e-coat fluid solution 114. The control of the immersion of the metal part 112 may include an adjustment of a trajectory of the metal part 112 across a length of the e-coat tank 302, a height of the metal part 112 at different points in the trajectory, and a speed of movement of the metal part 112 across the length of the e-coat tank 302. The details of the control of the trajectory is described, for example, in FIGS. 4A to 4C.

The control circuitry 216 may be further configured to control a plurality of ultrasonic transducers, i.e. the first set of ultrasonic transducers 312 and the second set of ultrasonic transducers 314, to direct a plurality of acoustic waves at an ultrasonic frequency in the zone-of-interest 316 of the e-coat tank 302. The directed plurality of acoustic waves at the ultrasonic frequency may cause a controlled degasification of the first amount of the dissolved gases from a volume of the e-coat fluid solution 114 that corresponds to the zone-of-interest 316. In some embodiments, the ultrasonic frequency may be between "20 kilohertz (KHz) to 50 KHz". In some embodiments, the ultrasonic frequency may be between "25 to 40 KHz". In other embodiments, the ultrasonic frequency may be one of "25 KHz" or "40 KHz". The ultrasonic frequency may be controlled such that a distribution of the acoustic energy is uniformly spread-out over the volume in the e-coat fluid solution 114 that corresponds to the zone-of-interest 316 in the e-coat tank 302.

It may be observed that when the plurality of acoustic waves are directed or applied at the ultrasonic frequency, for example, "25 KHz or 45 KHz", desired chemical reactions that pertains to electrophoretic deposition on the metal part 112 may be accelerated and undesired chemical reactions may be avoided in the e-coat tank 302. For example, the first set of ultrasonic transducers 312 and the second set of ultrasonic transducers 314 may be configured to generate the plurality of acoustic waves at the ultrasonic frequency of "25 kHz" and a defined power per cubic meter in a range of "10 to 100 Watts/Gallon". At such ultrasonic frequency, the plurality of acoustic waves may exhibit longer wavelength that may be insufficient to adversely affect a molecule to induce any unwanted chemical change in the e-coat fluid solution 114. Such an inert behavior of the plurality of acoustic waves for the radicals or molecules in the e-coat fluid solution 114 may be suitable for the controlled degasification (and/or de-agglomeration) of e-coat particles, such as the e-coat pigment and resin particles.

The control circuitry 216 may be further configured to control an electric voltage generator (not shown) of the power system 202 to apply a suitable electric voltage to the metal part 112 for a deposition of a coating layer of the e-coat pigment on the surface of the metal part 112. The thickness of the coating layer may be controlled based on the applied voltage.

The plurality of ultrasonic transducers may be in the zone-of-interest 316 such that the plurality of acoustic waves are directed uniformly in different directions throughout the volume of the e-coat fluid solution 114 in the zone-of-interest 316. Alternatively stated, the plurality of acoustic waves may be directed as omnidirectional acoustic waves as the corresponding ultrasonic transducer resonates at a high wave amplitude. The omnidirectional acoustic waves may correspond to cyclic positive pressure waves and negative pressure waves that occur at the ultrasonic frequency, for example, "25 kHz".

In a negative pressure phase (or a low pressure phase), molecules within the e-coat fluid solution 114 experience a physical force that leads to generation of vacuum nuclei that grows continuously up to a specific size. The specific size may be proportional to the ultrasonic frequency of the plurality of acoustic waves. The vacuum bubbles entrap a portion of the first amount of the dissolved gases, such as the H2 gas. In the positive pressure phase (or a high pressure phase of the half cycle), the bubbles that entrap the dissolved gases reach the surface of the e-coat fluid solution 114 and implode. The implosion of the bubbles leads to a degasification of the portion of the dissolved gases from the e-coat fluid solution 114. The energy released from the implosion (caused by the acoustic cavitation) may raise the temperature of the e-coat fluid solution 114 beyond the range of temperature values required for the deposition of the e-coat pigment on the metal part 112. Thus, the control circuitry 216 may control the temperature control system 204 to regulate the temperature of the e-coat fluid solution 114 within the range of temperature values.

As shown, the surface of the e-coat fluid solution 114 may comprise a first region 322, a second region 324, and a third region 326. The second region 324 and the third region 326 may correspond to the zone-of-interest 316. The first region 322 may correspond to the region on the surface of the e-coat fluid solution 114, other than the zone-of-interest 316. The first region 322 may be a less active gassing region as compared to the second region 324 and the third region 326. Also, the first set of ultrasonic transducers 312 may lie below the second region 324 and the second set of ultrasonic transducers 314 may lie below the third region 326. The effect of the acoustic cavitation and the control degasification may be visible from almost negligible or few bubbles in the second region 324 and the third region 326. In absence of the acoustic cavitation and the control degasification, the first region 322 is shown to have a plurality of bubbles on the surface.

The control circuitry 216 may be further configured to control a first intensity of the directed plurality of acoustic waves over a defined time period for a control over a deposition of the e-coat pigment of the e-coat fluid solution 114 over the metal part 112 of the vehicle. The first intensity may correspond to an acoustic intensity of the plurality of acoustic waves in the e-coat fluid solution 114. The control of the first intensity of the acoustic waves may correspond to a rate of a removal of the first amount of the dissolved gases from the e-coat fluid solution 114 of the e-coat tank 302. Alternatively stated, as the acoustic intensity increases (or decreases) at a given ultrasonic frequency, the acoustic cavitation, i.e., a rate of bubble formation and implosion also increases (or decreases) and thereby leads to an increase (or a decrease) in the removal of the first amount of the dissolved gases over the defined time period.

The application of the plurality of acoustic waves may accelerate a removal of gases, such as the hydrogen gas, in the e-coat fluid solution 114 by breaking intermolecular interactions. In some embodiments, the plurality of acoustic waves may be applied in addition to a controlled stir (e.g., by a mechanical stirrer or agitator) under a reduced pressure. The addition of the controlled stir may enhance an efficiency of the degasification of the e-coat fluid solution 114. Also, the directed plurality of acoustic waves may disperse and push the e-coat pigment evenly in different physically reachable and unreachable regions of the metal part 112. As a result, the deposition of the e-coat pigment on the metal part 112 may be uniform, with a minimum (or even zero) number of spots that have either no or poor deposition of the e-coat pigment.

In the zone-of-interest 316, the metal part 112 may be immersed in the e-coat fluid solution 114 at a specific height from a bottom level of the e-coat tank 302. The specific height may be selected based on a required acoustic pressure or a sound pressure level (in dB) on the surface of the metal part 112. Also, the specific height may be further selected to obtain a stable conical wave front between the metal part 112 and the first set of ultrasonic transducers 312 and the second set of ultrasonic transducers 314. The acoustic pressure may be a function of the specific height of the metal part 112 from the bottom portion 310 of the e-coat tank 302 and an angle of incidence of the plurality of acoustic waves onto the surface of the metal part 112. Thus, in some embodiments, the control circuitry 216 may be further configured to control an orientation of the metal part 112 in the e-coat fluid solution 114. The orientation may be controlled to cause a change in an angle of incidence of the plurality of acoustic waves on the surface of the metal part 112. The change in the angle of incidence may cause a change in the acoustic pressure on the surface of the metal part 112. In such cases, the acoustic pressure may correspond to the controlled first intensity of the directed plurality of acoustic waves within the zone-of-interest 316.

Conventionally, there may be larger spatial and time-dependent pressure variations on the surface of the metal upon an increase in the specific height of the metal part 112. Such larger spatial and time-dependent pressure variations may lead to development of pressure islands dispersed around the surface of the metal part 112. This may lead to a non-uniformity in the deposition of the e-coat pigment around different regions on the surface of the metal part 112.

In some embodiments, the deposition of the e-coat pigment on the metal part 112 may be further based an acoustic range of each ultrasonic transducer of the plurality of ultrasonic transducers (such as the first set of ultrasonic transducers 312 and the second set of ultrasonic transducers 314) from the metal part 112. The acoustic range may correspond to the specific height of the metal part 112 from the bottom level of the e-coat tank 302. More specifically, the acoustic range may depend on factors such as, a speed of sound as a function of the temperature and a composition of the e-coat fluid solution 114, a wavelength of the acoustic waves, an attenuation values of acoustic waves for the ultrasonic frequency, a sound radiation pattern, an amplitude of a return echo, and a sound pressure level (in dB). The amplitude of the return echo may depend on the specific height of the metal part 112, a geometry of the surface of the metal part 112, and a size or an area of the surface of the metal part 112 exposed to the plurality of acoustic waves. The control circuitry 216 may be configured to select a specific sound pressure level (in dB) at the ultrasonic frequency for the plurality of ultrasonic transducers (such as the first set of ultrasonic transducers 312 and the second set of ultrasonic transducers 314). For example, at "25 kHz", the sound pressure level may be "55 kPa". Based on the sound pressure level, the acoustic range may be selected to be around"1.2" meters.

Conventionally, the e-coat pigment (and/or resins) may agglomerate into lumps throughout the volume of the e-coat tank 302. The agglomeration of the e-coat pigment (and/or resins) may affect a rate of the deposition of the e-coat pigment (and/or resins) and a deposition amount of the e-coat pigment (and/or resins) on the metal part 112. Also, the e-coat pigment in the e-coat fluid solution 114 may stick to the side walls and the bottom portion 310 of the e-coat tank 302. This may cause the e-coat pigment (and/or resins) to remain on the side walls and the bottom portion 310 as the e-coat fluid solution 114 is drained out from the e-coat tank 302.

In accordance with an embodiment, the control circuitry 216 may be configured to control at least the first intensity or the ultrasonic frequency of the directed plurality of acoustic waves over the defined time period to cause a dispersion or a de-agglomeration of the e-coat pigment in the e-coat fluid solution 114. At least the first intensity or the ultrasonic frequency of the directed plurality of acoustic waves may be controlled such that particles of the e-coat pigment unstick to walls of the e-coat tank 302. This may be achieved from the localized cyclic pressures and temperatures that may be exerted due to the acoustic cavitation in the e-coat fluid solution 114. Such pressures and temperatures may loosen up agglomerated blobs of the e-coat pigment from the walls and the bottom portion 310 of the e-coat tank 302 and within the e-coat fluid solution 114. This may further render the walls and the bottom portion 310 of the e-coat tank 302 microscopically clean for a reuse.

In accordance with another embodiment, the control circuitry 216 may be configured to communicate one or more control signals to the plurality of ultrasonic transducers (such as the first set of ultrasonic transducers 312 and the second set of ultrasonic transducers 314). The one or more control signals may be communicated to control a gradual or a periodic increase of the first intensity of the directed plurality of acoustic waves over the defined time period to reduce a sedimentation or agglomeration of the e-coat pigment or the resin at the bottom portion 310 of the e-coat tank 302.

Figure 4A:
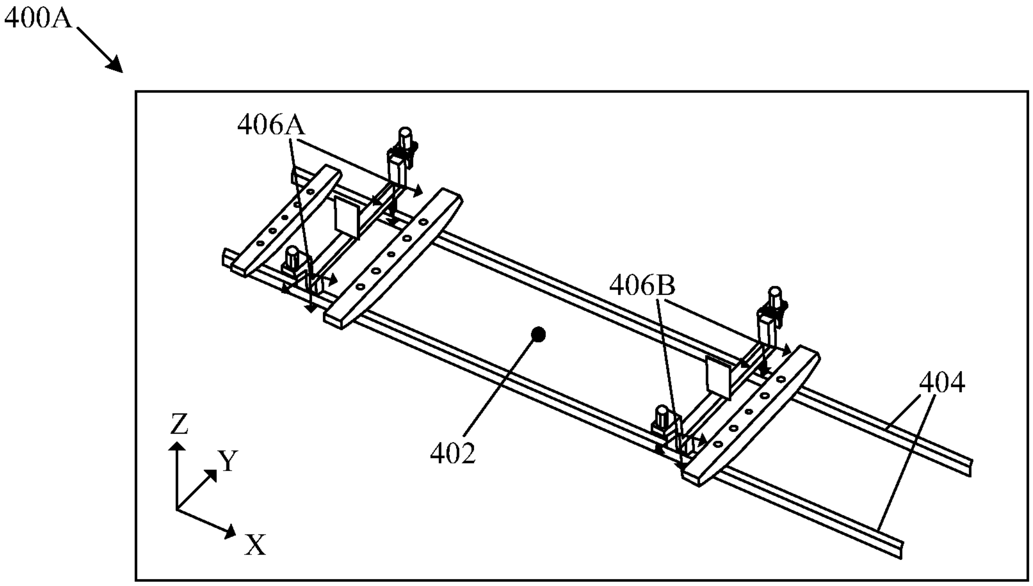
FIG. 4A illustrates a carrier frame for supporting a metal part of a vehicle, m accordance with an embodiment of the disclosure.

FIG. 4A illustrates a earner frame for supporting a metal part of a vehicle, in accordance with an embodiment of the disclosure. FIG. 4A is explained in conjunction with elements from FIGS. 1, 2, 3A, 3B, and 3C. With reference to FIG. 4A, there is shown a carrier frame 400A that may act a supporting mount and a guiding apparatus for the metal part 112 of the vehicle. In FIG. 4A, there is shown a start point 402 (i.e. a location) indicative of a center coordinate of the carrier frame 400A with respect to a vehicle coordinate system (represented by X, Y, and Z coordinates). The carrier frame 400A may include a guide rail 404 that may be used to guide the metal part 112 through the e-coat fluid solution 114 and across the length of the e-coat tank 104 using movable arms 406A and 406B of the carrier frame 400A.

The metal part 112, such as a vehicle body or other complex metal parts of the vehicle, may be mounted on the carrier frame 400A. The movable arms 406A and 406B of the carrier frame 400A may be configured to hold or movably affix the metal part 112 (such as the vehicle body or other complex metal parts of the vehicle) for translation and rotational motion along different axes of the vehicle coordinate system. The movable arms 406A and 406B of the carrier frame 400A may be configured to move the metal part 112 in accordance with a defined trajectory through the e-coat fluid solution 114 in the e-coat tank 104. All the kinematics (translation and rotation) of the metal part 112 may be defined with respect to a reference coordinate, such as a center location of the carrier frame 400A.

Figure 4B:
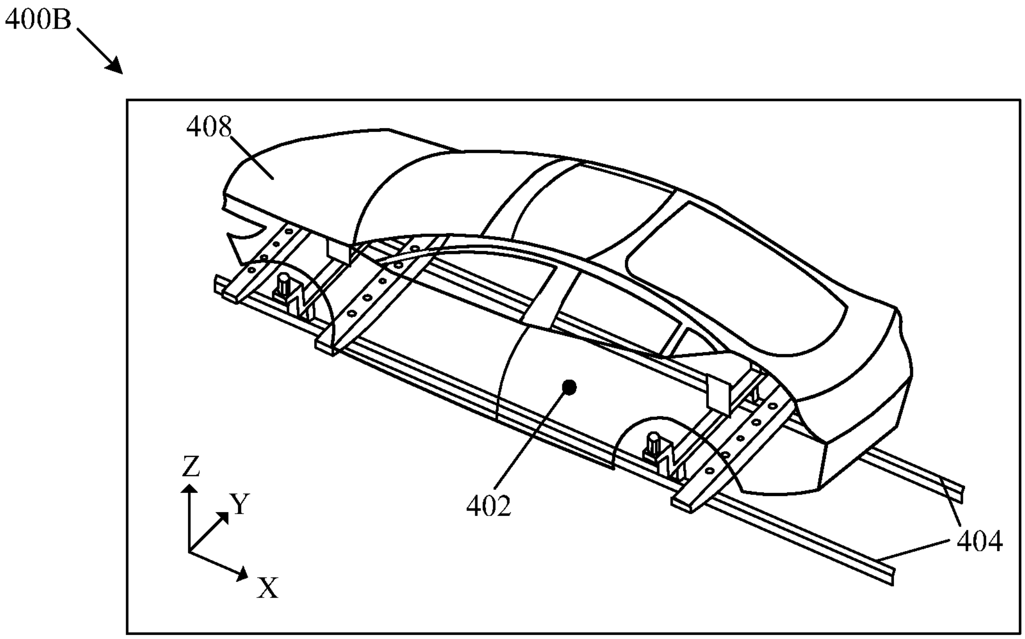
FIG. 4B illustrates a view of a vehicle body mounted on the carrier frame of FIG. 4A, in accordance with an embodiment of the disclosure.

FIG. 4B illustrates a view of a vehicle body mounted on the carrier frame of FIG. 4A, in accordance with an embodiment of the disclosure. FIG. 4B is explained in conjunction with elements from FIGS. 1, 2, 3A, 3B, 3C, and 4A. With reference to FIG. 4B, there is shown a view 400B of an exemplary complex metal part of a vehicle, such as a vehicle body 408 mounted on the carrier frame 400A. The vehicle body 408 may be mounted on the carrier frame 400A before the vehicle body 408 is immersed in the e-coat fluid solution 114, stored within the e-coat tank 104 for the e-coat process. The movement of the carrier frame 400A may be controlled based on instructions from the control circuitry 216. The control circuitry 216 may be configured to adjust a z-position (i.e. a height) of the vehicle body 408 within the e-coat tank 104. Also, the control circuitry 216 may be configured to adjust an x-position and a y-position (i.e. a forward displacement and a sideways displacement) of the vehicle body 408 in the e-coat tank 104.

Figure 4C:
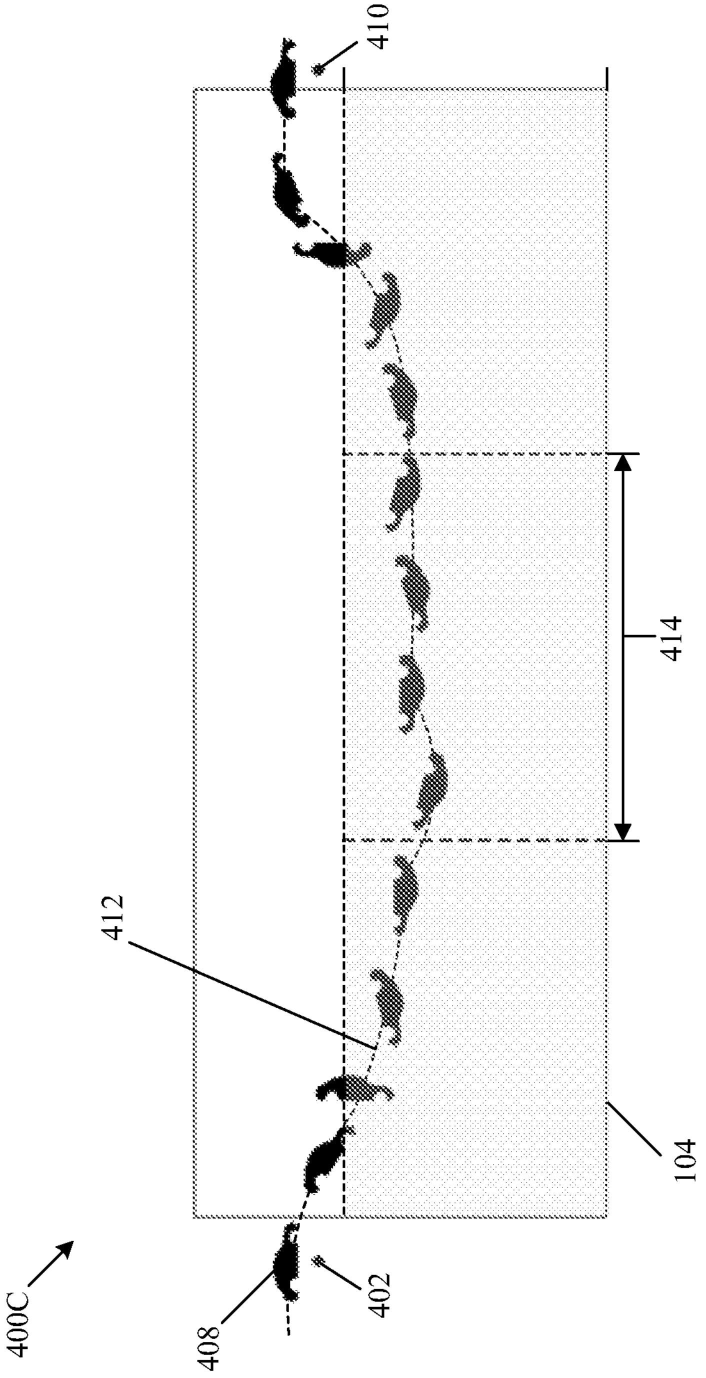
FIG. 4C illustrates an exemplary trajectory of the vehicle body of FIG. 4B within an e-coat tank of the coating system of FIG. 1, in accordance with an embodiment of the disclosure.

FIG. 4C illustrates an exemplary trajectory of the vehicle body of FIG. 4B within an e-coat tank of the coating system of FIG. 1, in accordance with an embodiment of the disclosure. FIG. 4C is explained in conjunction with elements from FIGS. 1, 2, 3A, 3B, 3C, 4A, and 4B. With reference to FIG. 4C, there is shown the start point 402 (i.e. a center location of the carrier frame 400A) and an end point 410 of an exemplary defined trajectory 412 in which the vehicle body 408 is traversed through the e-coat tank 104 for the e-coat process. There is further shown the zone-of-interest 414 in the e-coat tank 104. It may be observed based on experimentation that the zone-of-interest 414 is the mid portion of the e-coat tank 104 in which the vehicle body 408 remains completely immersed in the e-coat fluid solution 114. The zone-of-interest 414 may correspond to a chemically active zone in the e-coat tank 104. In some embodiments, the zone-of-interest 414 may extend substantially along the length of the e-coat tank 104. In other embodiments, the zone-of-interest 414 may include any region in which the vehicle body 408 remains fully submerged in the e-coat tank 104. It may be further observed that a build-up or concentration of the dissolved gases, particularly hydrogen gas, remains maximum in this zone-of-interest 414 as compared to other zones or regions of the e-coat tank 104.

The control circuitry 216 may be configured to control the defined trajectory 412 of the metal part 112, such as the vehicle body 408, through the e-coat fluid solution 114 within the e-coat tank 104. The metal part 112, such as the vehicle body 408, may be mounted on the carrier frame 400A. The control circuitry 216 may be further configured to control the carrier frame 400A to guide the metal part 112, such as vehicle body 408, across the length of the e-coat tank 104, in accordance with the defined trajectory 412. The e-coat pigment may deposit on the surface of the metal part 112, such as the vehicle body 408, while the metal part 112 is guided across the length of the e-coat tank 104 in accordance with the defined trajectory 412.

Figure 5:
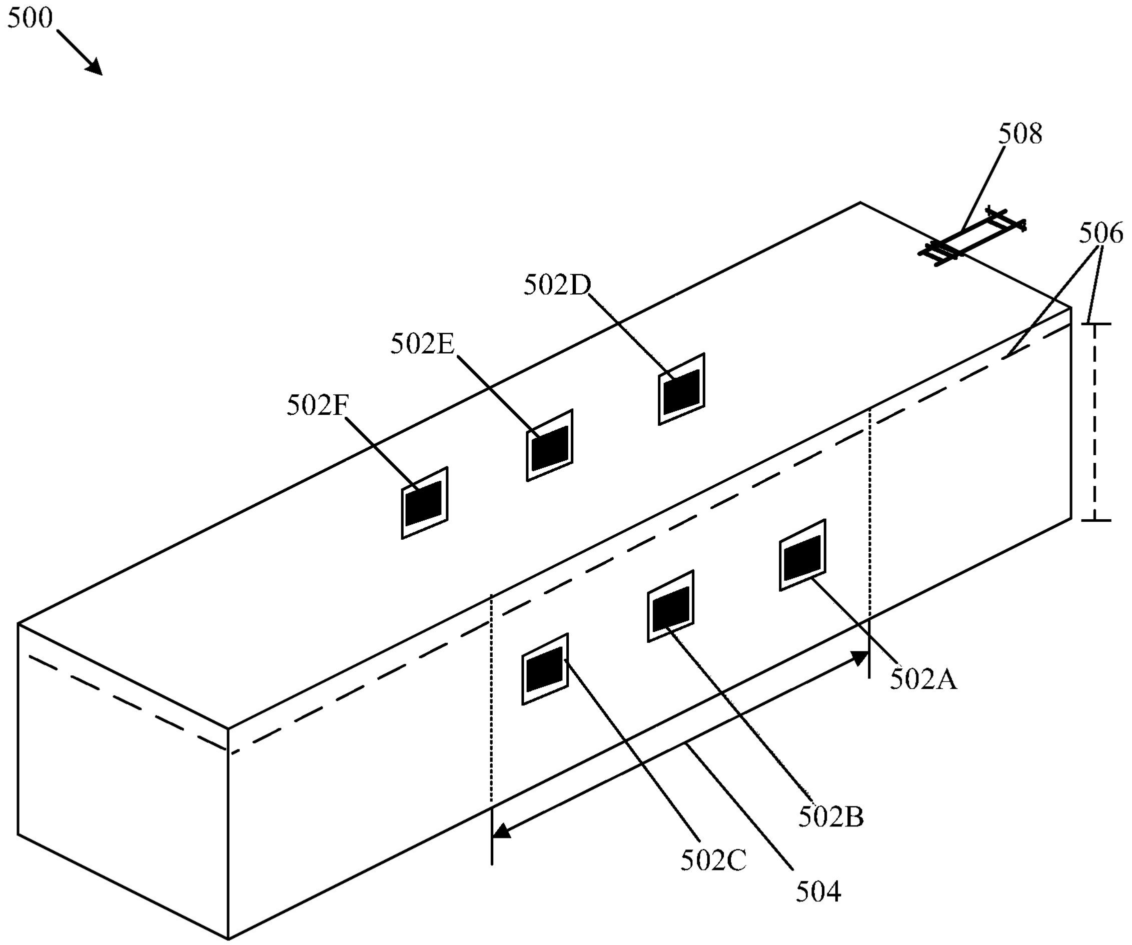
FIG. 5 illustrates a view of an exemplary e-coat tank for e-coating a metal part and degasification of an e-coat fluid solution, in accordance with an embodiment of the disclosure.

FIG. 5 illustrates a view of an exemplary e-coat tank for e-coating a metal part and degasification of an e-coat fluid solution, in accordance with an embodiment of the disclosure. FIG. 5 is explained in conjunction with elements from FIGS. 1, 2, 3A, 3B, 3C, 4A, 4B, and 4C. With reference to FIG. 5, there is shown a view of an e-coat tank 500 as part of the coating system 102.

The e-coat tank 500 may be one of the exemplary embodiments for the e-coat tank 104. The e-coat tank 500 may include a plurality of ultrasonic transducers 502A, 502B, 502C, 502D, 502E, and 502F in a zone-of-interest 504 of the e-coat tank 500. The plurality of ultrasonic transducers 502A, 502B, 502C, 502D, 502E, and 502F may include a first set of ultrasonic transducers 502A, 502B, and 502C and a second set of ultrasonic transducers 502D, 502E, and 502F. The first set of ultrasonic transducers 502A, 502B, and 502C and the second set of ultrasonic transducers 502D, 502E, and 502F may be coupled on a first side wall and a second side wall of the e-coat tank 500, respectively, in accordance with a sidewall configuration. The e-coat tank 500 may store the e-coat fluid solution 114 up to a specific level 506 with respect to a bottom of the e-coat tank 500. The e-coat tank 500 may further include a carriage mount 508 to support a carrier frame, such as the carrier frame 400A. The position of the first set of ultrasonic transducers 502A, 502B, and 502C and the second set of ultrasonic transducers 502D, 502E, and 502F on the first side wall and the second side wall of the e-coat tank 500 may help to disperse the e-coat pigment in the e-coat fluid solution uniformly across a volume that corresponds to the zone-of-interest 504. In certain embodiments, the sidewall configuration may be used along with a non-immersible ultrasonic transducer to effectively degas the dissolved gases from the zone-of-interest 504 and to accelerate deposition of the e-coat pigment on the metal part 112.

Figure 6:
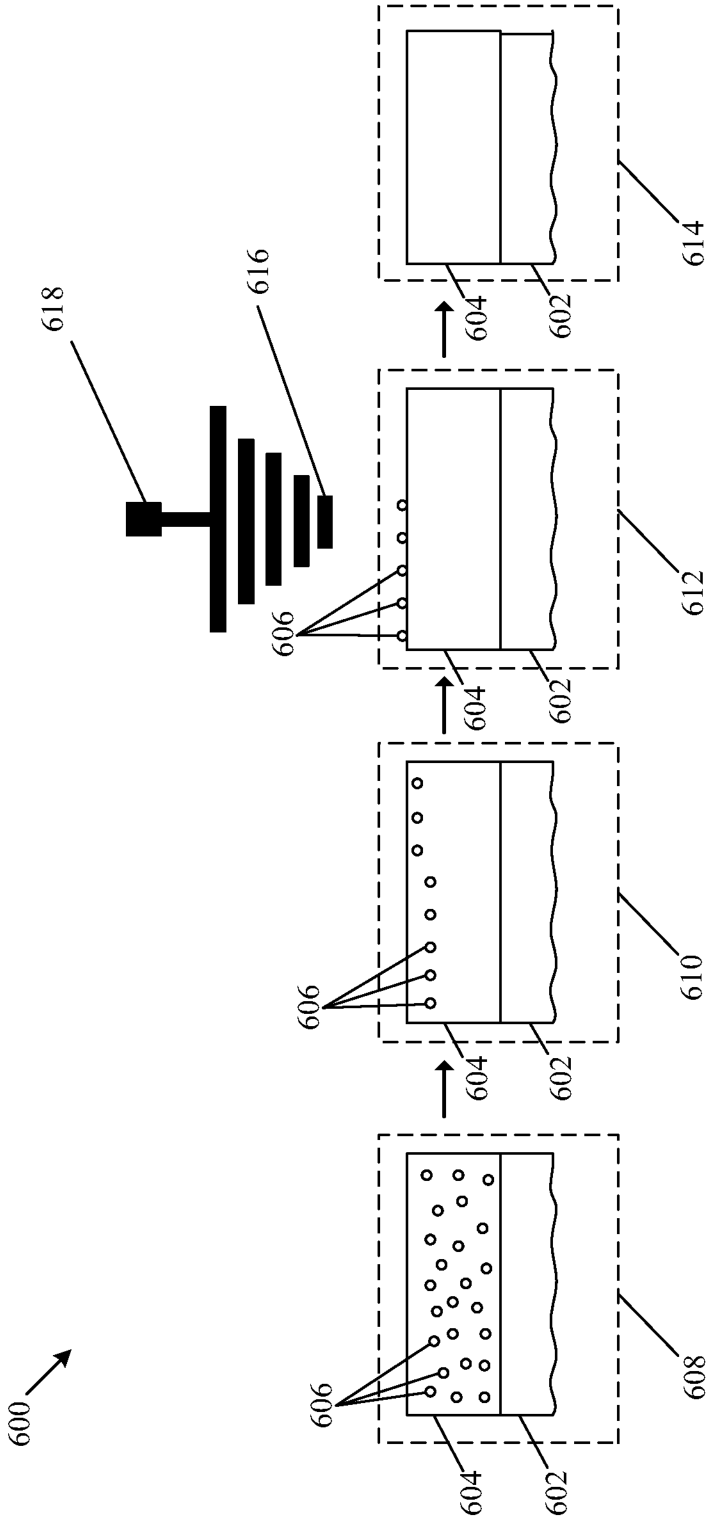
FIG. 6 illustrates a diagram for a process of contactless rupture of bubbles semi-submerged within a coating layer formed on a metal part of the vehicle, in accordance with an embodiment of the disclosure.

FIG. 6 illustrates a diagram for a process of contactless rupture of bubbles semi-submerged within a coating layer formed on a metal part of the vehicle, in accordance with an embodiment of the disclosure. FIG. 6 is explained in conjunction with elements from FIGS. 1, 2, 3A, 3B, 3C, 4A, 4B, 4C, and 5. With reference to FIG. 6, there is shown a coating surface 602 of the vehicle body 408, a coating layer 604, and a plurality of bubbles 606 in the coating layer 604.

At 608, a uniform distribution of the plurality of bubbles 606 within the coating layer 604, is depicted before or during application of an acoustic wave on the coating layer 604. At 610, some of the plurality of bubbles 606 appear to rise to a surface of the coating layer 604, during application of the acoustic wave on the coating layer 604. At 612, some of the plurality of bubbles 606 are shown as semi-submerged within the coating layer 604 formed on the coating surface 602 of the vehicle body 408 (i.e. a complex metal part). There is also shown a radiating plate 616 of a non-immersible ultrasonic transducer 618 positioned in parallel to the coating surface 602 of the vehicle body 408. In some embodiments, instead of the use of the plurality of ultrasonic transducers 108, one or more non-immersible ultrasonic transducers, such as the non-immersible ultrasonic transducer 618, may be used for a contactless rupture of the plurality of bubbles 606 semi-submerged within the coating layer 604.

For example, when the vehicle body 408 is taken out or emerges from the e-coat tank 104, the control circuitry 216 may be configured to control the non-immersible ultrasonic transducer 618 to direct an acoustic wave from the radiating plate 616 of the non-immersible ultrasonic transducer 618 towards the coating surface 602 of the vehicle body 408. The acoustic wave with an ultrasonic frequency, for example, "25 KHz" or "40 KHz", may be directed to rupture the plurality of bubbles 606 semi-submerged within the coating layer 604 on the vehicle body 408. This additional application of the acoustic wave may ensure that no gas bubble is entrapped within the coating layer 604 both during and after the e-coat process. In some embodiments, the rupture of the plurality of bubbles 606 semi-submerged within the coating layer 604 may be done within the e-coat tank 104 by use of the non-immersible ultrasonic transducer 618. Thus, the coating layer 604 on the coating surface 602 of the vehicle body 408 may be devoid of gas bubbles.

At 614, the coating surface 602 of the coating layer 604 is shown with almost no bubbles after the contactless rupture of the plurality of bubbles 606. As the coating layer 604 remains devoid of the plurality of bubbles 606, an additional paint coat may be applied on the coating layer 604. The paint coat may then form a strong bond with the vehicle body 408 and result in an improved paint finish. The complete degasification of the coating layer 604 may enhance aesthetic characteristics, corrosion protection, and an appearance and a durability of the vehicle body 408.

Figure 7A:
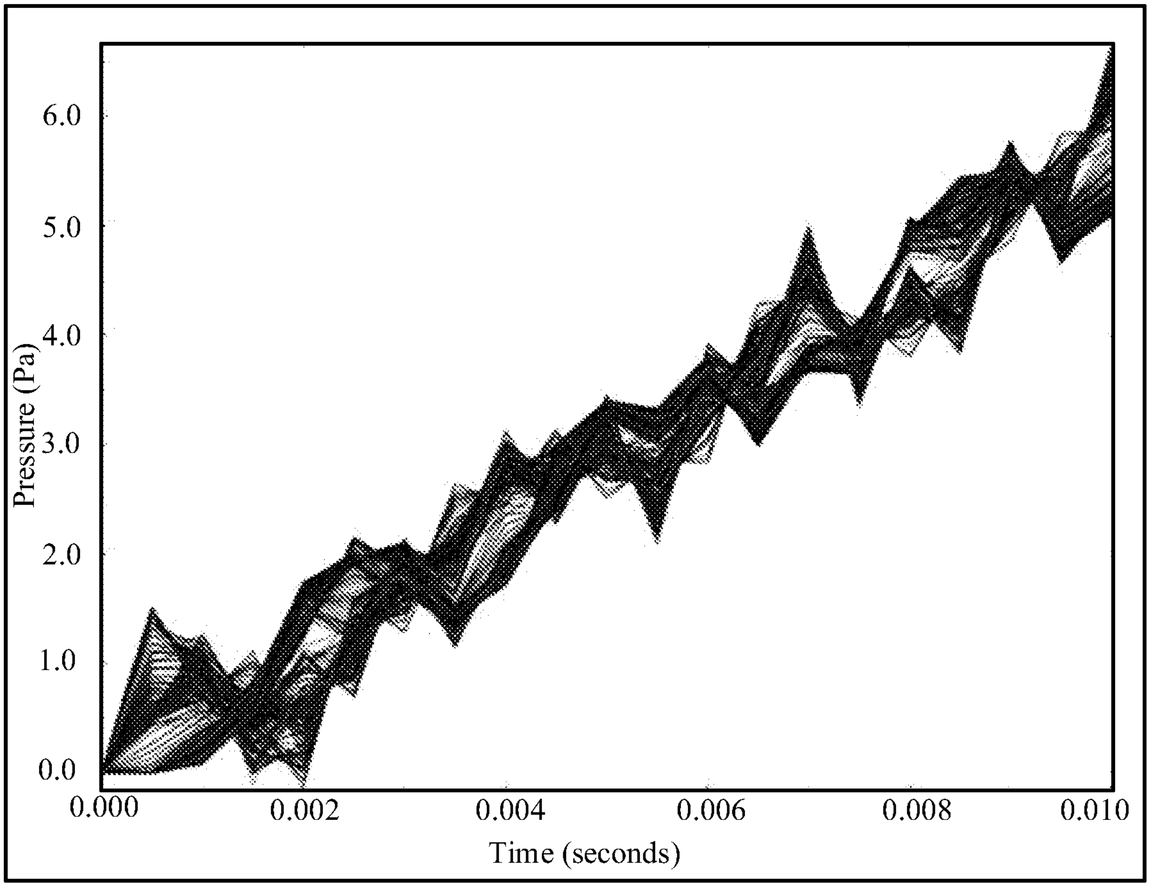
FIG. 7A illustrates a plot of acoustic pressure distribution versus time on a surface of a metal part based on a center-to-center distance between two acoustic sources, in accordance with an embodiment of the disclosure.

FIG. 7A illustrates a plot of acoustic pressure distribution versus time on a surface of a metal part based on a center-to-center distance between two acoustic sources, in accordance with an embodiment of the disclosure. FIG. 7A is described in conjunction with elements from FIGS. 1, 2, 3A, 3B, 3C, 4A, 4B, 4C, 5, and 6. With reference to FIG. 7A, there is shown a plot 700A. The plot 700A represents an acoustic pressure distribution versus time on a surface of the metal part 112 based on a center-to-center distance between two acoustic sources, such as two ultrasonic transducers. The plot 700A further represents the acoustic pressure distribution versus time for an optimal center-to-center distance (e.g., "550 mm") between two adjacent ultrasonic transducers of the plurality of ultrasonic transducers 108. In cases where the center-to-center distance is equal to the optimal center-to-center distance, a smoother pressure build-up may be observed on the surface of the metal part 112. In cases where the center-to-center distance increases (or decreases) beyond the optimal center-to-center distance, larger spatial non-uniformities in the pressure may be observed in a plot of the acoustic pressure distribution versus time on the surface of the metal part 112.

Figure 7B:
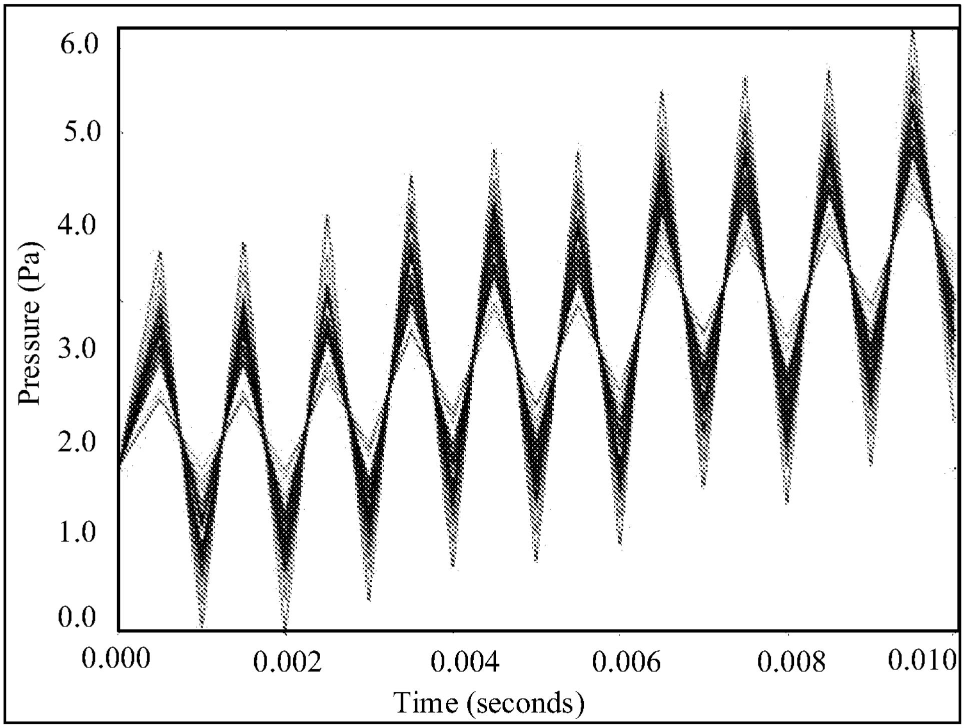
FIG. 7B illustrates a plot of acoustic pressure distribution versus time on a surface of an acoustic source, in accordance with an embodiment of the disclosure.

FIG. 7B illustrates a plot of acoustic pressure distribution versus time on a surface of an acoustic source, in accordance with an embodiment of the disclosure. FIG. 7B is described in conjunction with elements from FIGS. 1, 2, 3A, 3B, 3C, 4A, 4B, 4C, 5, 6, and 7A. With reference to FIG. 7B, there is shown a plot 700B. The plot 700B represents an acoustic pressure distribution versus time on a surface of ultrasonic transducer of the plurality of ultrasonic transducers 108. The plot 700B of the acoustic pressure distribution versus time may be based on a center-to-center distance between two acoustic sources, such as two ultrasonic transducers. The plot 700B further represents the acoustic pressure distribution versus time for an optimal center-to-center distance (e.g., "550 mm") between two adjacent ultrasonic transducers of the plurality of ultrasonic transducers 108. In cases where the center-to-center distance is equal to the optimal center-to-center distance, a smoother pressure build-up may be observed on the surface of the ultrasonic transducer. In cases where the center-to-center distance increases (or decreases) beyond the optimal center-to-center distance, larger spatial non-uniformities in the pressure may be observed in a plot of the acoustic pressure distribution versus time on the surface of the metal part 112.

Figure 8A:
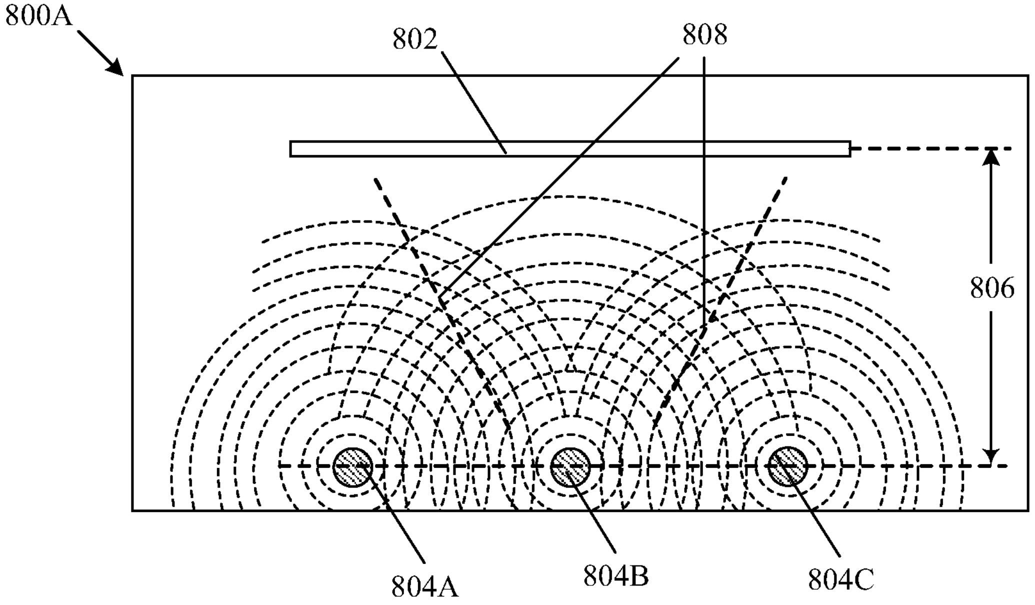
FIG. 8A illustrates a diagram for development of a wave front on a surface of a metal part based on a distance of acoustic sources from the surface of the metal part, in accordance with an embodiment of the disclosure.

FIG. 8A illustrates a diagram for development of a wave front on a surface of a metal part based on a distance of acoustic sources from the surface of the metal part, in accordance with an embodiment of the disclosure. FIG. 8A is described in conjunction with elements from FIGS. 1, 2, 3A, 3B, 3C, 4A, 4B, 4C, 5, 6, 7A, and 7B. With reference to FIG. 8A, there is shown a diagram 800A.

In the diagram 800A, there is shown a surface 802 of the metal part 112 and a plurality of ultrasonic transducers (such as a first ultrasonic transducer 804A, a second ultrasonic transducer 804B, and a third ultrasonic transducer 804C). The surface 802 and the plurality of ultrasonic transducers are immersed in the e-coat fluid solution 114. The surface 802 of the metal part 112 may be at a specific height 806 in the zone-of-interest 116. There is further shown a plurality of acoustic waves that form a conical wave-front 808 between the surface 802 and the plurality of ultrasonic transducers.

As shown, the specific height 806 for the surface 802 may be an optimal height, for example, "800 mm". The specific height 806 may be selected to ensure that a smoother pressure builds up on the surface 802. The development of the conical wave-front 808 may be indicative of smoother and uniform pressure build up on the surface 802. In cases where the specific height 806 increases (or decreases) as compared to the optimal height, larger spatial and time-dependent pressure variations may be observed on the surface 802. Also, instead of the conical wave-front 808, a group of dispersed pressure islands may be observed around the surface 802 of the metal part 112.

Figure 8B:
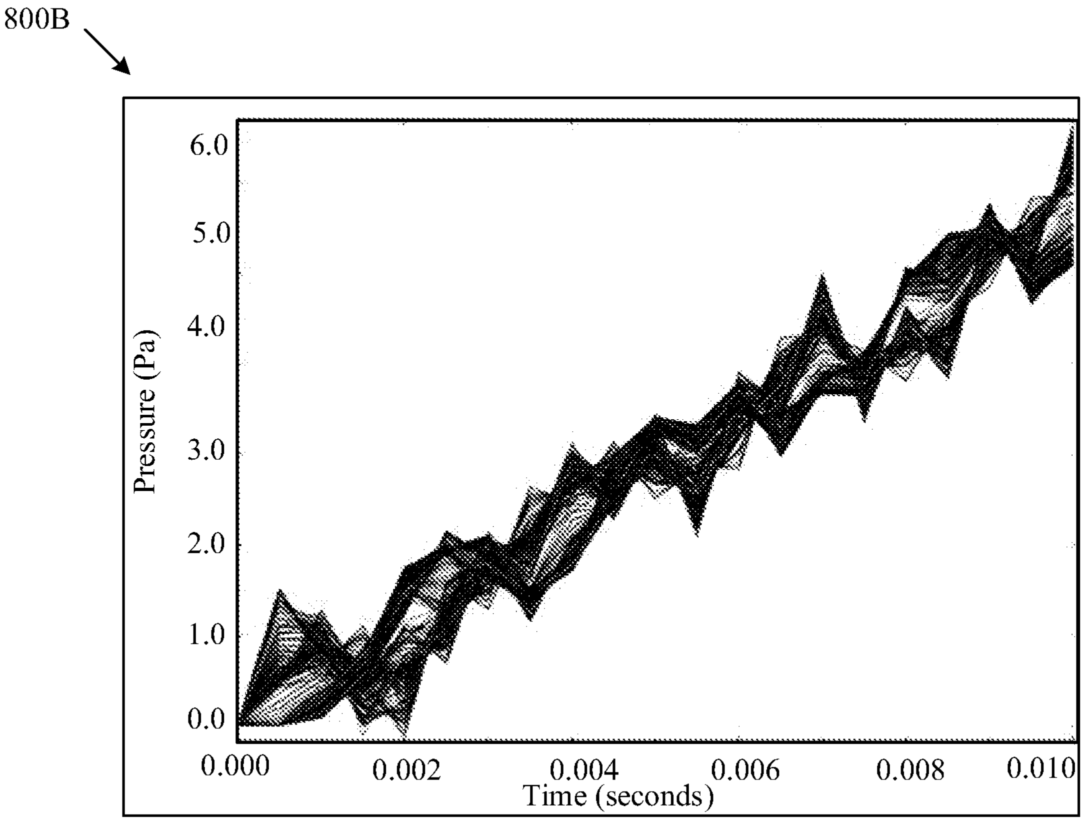
FIG. 8B illustrates a plot of acoustic pressure distribution versus time on the surface of the metal part of FIG. 8A, in accordance with an embodiment of the disclosure.

FIG. 8B illustrates a plot of acoustic pressure distribution versus time on the surface of the metal part of FIG. 8A, in accordance with an embodiment of the disclosure. FIG. 8B is described in conjunction with elements from FIGS. 1, 2, 3A, 3B, 3C, 4A, 4B, 4C, 5, 6, 7A, 7B, and 8A. With reference to FIG. 8B, there is shown a plot 800B. The plot 800B represents an acoustic pressure distribution versus time on the surface 802 of the metal part 112 based on a distance (i.e. the specific height 806) of the metal part 112 from the acoustic sources, such as the plurality of ultrasonic transducers. The plot 800B further represents the acoustic pressure distribution versus time for an optimal height (e.g., "800 mm") for the surface 802 of the metal part 112.

In cases where the specific height 806 is equal to the optimal height, a smoother pressure build-up may be observed on the surface 802 of the metal part 112. In cases where the specific height 806 increases (or decreases) as compared to the optimal height, larger spatial non-uniformities in the pressure may be observed in a plot of the acoustic pressure distribution versus time on the surface 802 of the metal part 112.

Figure 9A:
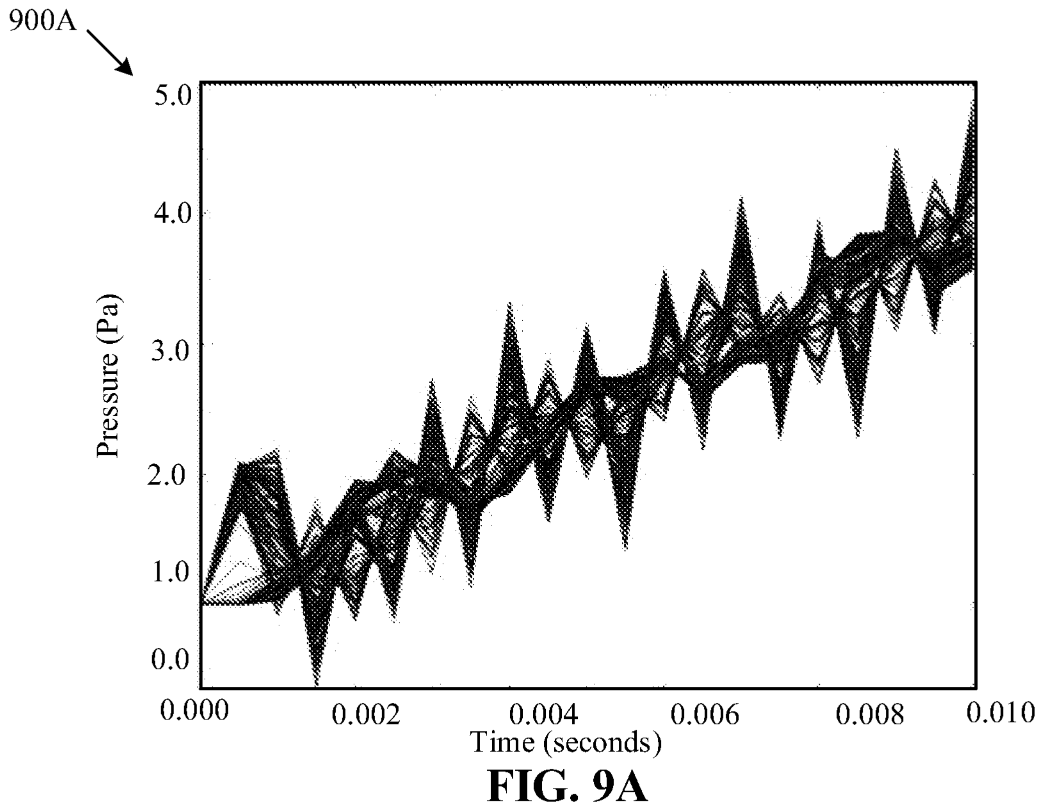
FIG. 9A illustrates a plot of conventional acoustic pressure distribution versus time on a surface of a metal part for a unidirectional acoustic source.

FIG. 9A illustrates a plot of conventional acoustic pressure distribution versus time on a surface of a metal part for a unidirectional acoustic source. With reference to FIG. 9A, there is shown a plot 900A. The plot 900A represents a conventional acoustic pressure distribution versus time on a surface of the metal part 112 for a unidirectional acoustic source. The unidirectional acoustic source may radiate a plurality of acoustic waves only in an upward direction. As shown, the plot 900A includes multiple closely spaced positive and negative peaks that may be indicative of larger spatial non-uniformities in the pressure from the unidirectional radiation of the plurality of acoustic waves.

Figure 9B:
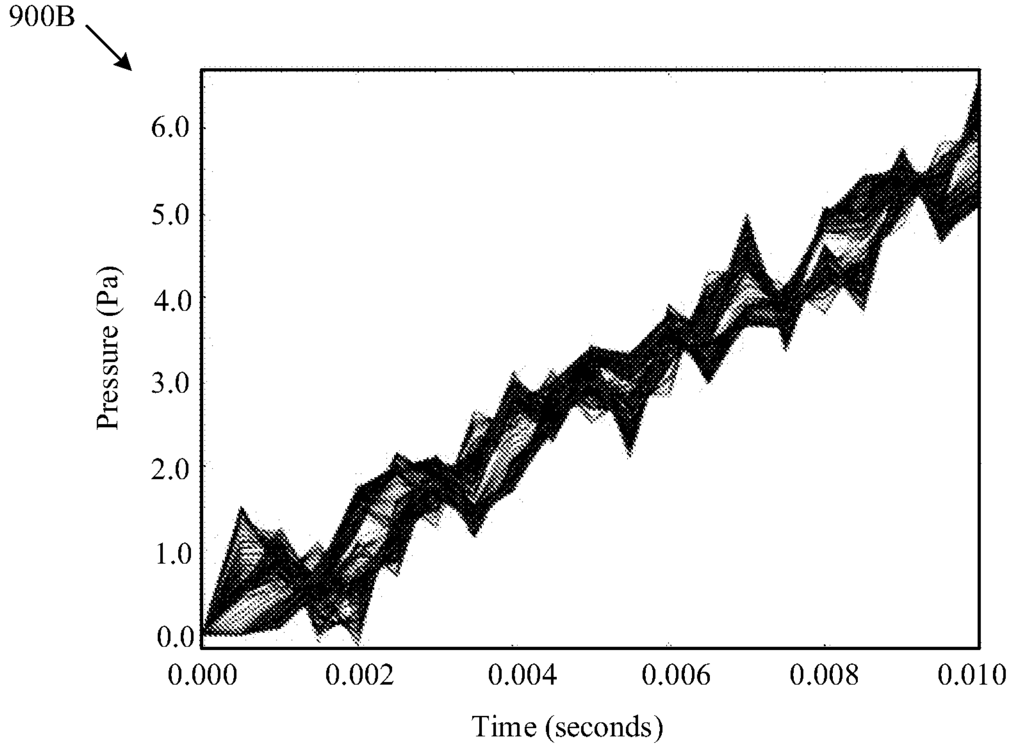
FIG. 9B illustrates a plot of acoustic pressure distribution versus time on a surface of a metal part for an omnidirectional acoustic source, in accordance with an embodiment of the disclosure.

FIG. 9B illustrates a plot of acoustic pressure distribution versus time on a surface of a metal part for an omnidirectional acoustic source, in accordance with an embodiment of the disclosure. FIG. 9B is described in conjunction with elements from FIGS. 1, 2, 3A, 3B, 3C, 4A, 4B, 4C, 5, 6, 7A, 7B, 8A, and 8B. With reference to FIG. 9B, there is shown a plot 900B. The plot 900B represents an acoustic pressure distribution versus time on a surface of the metal part 112 based on an omnidirectional acoustic source, such as the plurality of ultrasonic transducers 108. The omnidirectional acoustic source may generate an omnidirectional radiation of acoustic waves in the e-coat fluid solution 114. The omnidirectional acoustic source may resonate at a very high wave amplitude and thereby generate cyclic positive and negative pressure waves at the ultrasonic frequency. As shown, the plot 900B includes smaller positive and negative peaks for the acoustic pressure distribution with a relatively larger time gap as compared to the plot 900A. This may be indicative of a development of a smoother pressure build-up from the omnidirectional radiation of the plurality of acoustic waves.

Figure 10:
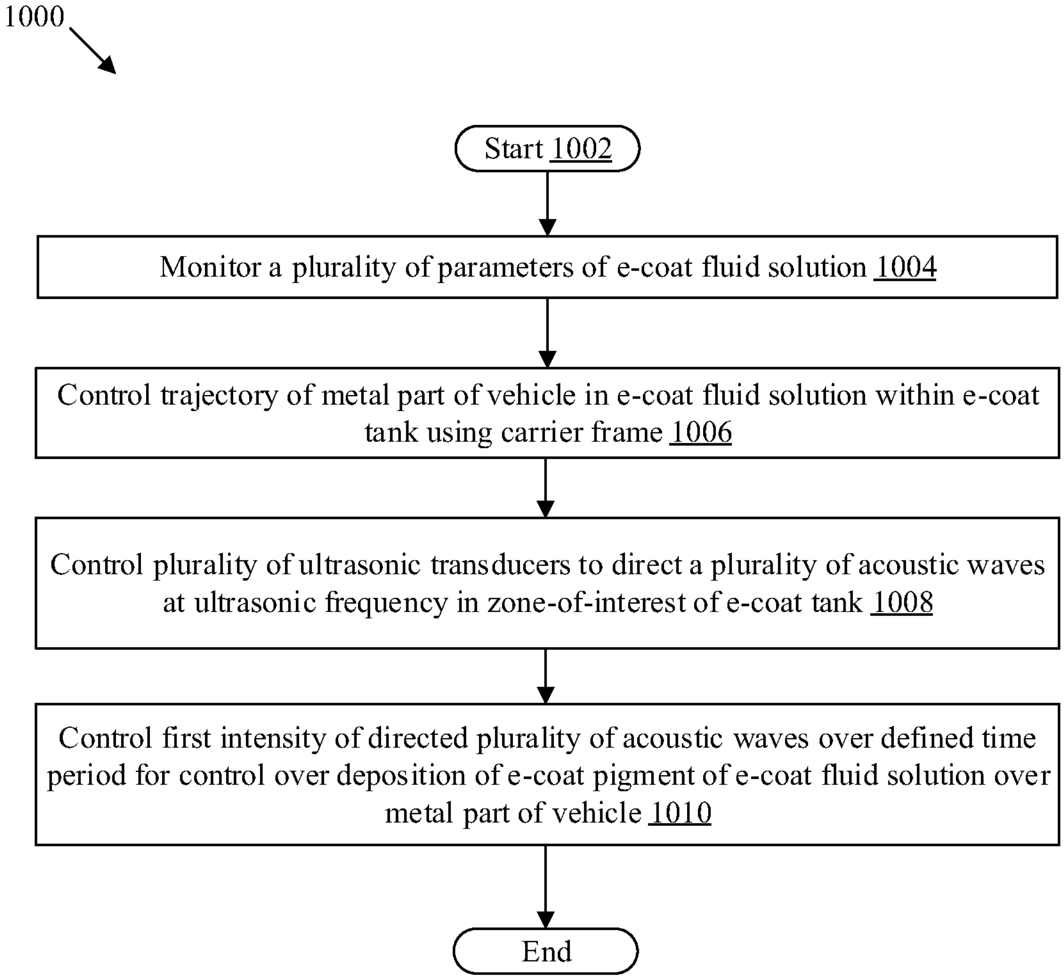
FIG. 10 is a flowchart that illustrates an exemplary method for e-coating and degasification of a coating fluid during e-coat, in accordance with an embodiment of the disclosure.

FIG. 10 is a flowchart that illustrates an exemplary method for e-coating and degasification of a coating fluid during e-coat, in accordance with an embodiment of the disclosure. FIG. 10 is explained in conjunction with elements from FIGS. 1, 2, 3A, 3B, 3C, 4A, 4B, 4C, 5, 6, 7A, 7B, 8A, 8B, and 9B. With reference to FIG. 10, there is shown a flowchart 1000. The operations, implemented in the coating system 102, may begin at 1002 and proceed to 1004.

At 1004, a plurality of parameters of the e-coat fluid solution 114 may be monitored. The control circuitry 216, in conjunction with the temperature control system 204, may be configured to monitor the plurality of parameters of the e-coat fluid solution 114. The plurality of parameters may include, but are not limited to, a pH level of the e-coat fluid solution 114, a concentration of the e-coat pigment or resin, pigment to binder ratio, and an acoustic pressure, and a partial pressure of the dissolved gases in the e-coat fluid solution 114.

At 1006, a trajectory of the metal part 112 may be controlled in the e-coat fluid solution 114 within the e-coat tank 104, using the carrier frame 110. The control circuitry 216 may be configured to control the trajectory of the metal part 112 in the e-coat fluid solution 114 within the e-coat tank 104, using the carrier frame 110. An example of the control of the trajectory of the vehicle body 408 within the e-coat tank 104, has been shown and described in the FIG. 4C.

At 1008, the plurality of ultrasonic transducers 108 may be controlled to direct a plurality of acoustic waves at the ultrasonic frequency in the zone-of-interest 116 of the e-coat tank 104. The control circuitry 216 may be configured to control the plurality of ultrasonic transducers 108 to direct the plurality of acoustic waves at the ultrasonic frequency in the zone-of-interest 116 of the e-coat tank 104.

At 1010, a first intensity of the directed plurality of acoustic waves may be controlled over a defined time period for a control over the deposition of the e-coat pigment of the e-coat fluid solution 114 over the metal part 112 of the vehicle. The control circuitry 216 may be configured to control the first intensity of the directed plurality of acoustic waves over the defined time period for the control over the deposition of the e-coat pigment of the e-coat fluid solution 114 over the metal part 112 of the vehicle. In accordance with an embodiment, the control circuitry 216 may be further configured to control an electric voltage generator (not shown) of the coating system 102 to apply a suitable electric voltage to the metal part 112. The application of the suitable electric voltage may cause a deposition of a coating layer of an e-coat pigment on the metal part 112. The thickness of the coating layer may be controlled based on the applied voltage. Control passes to end.

Figure 11:
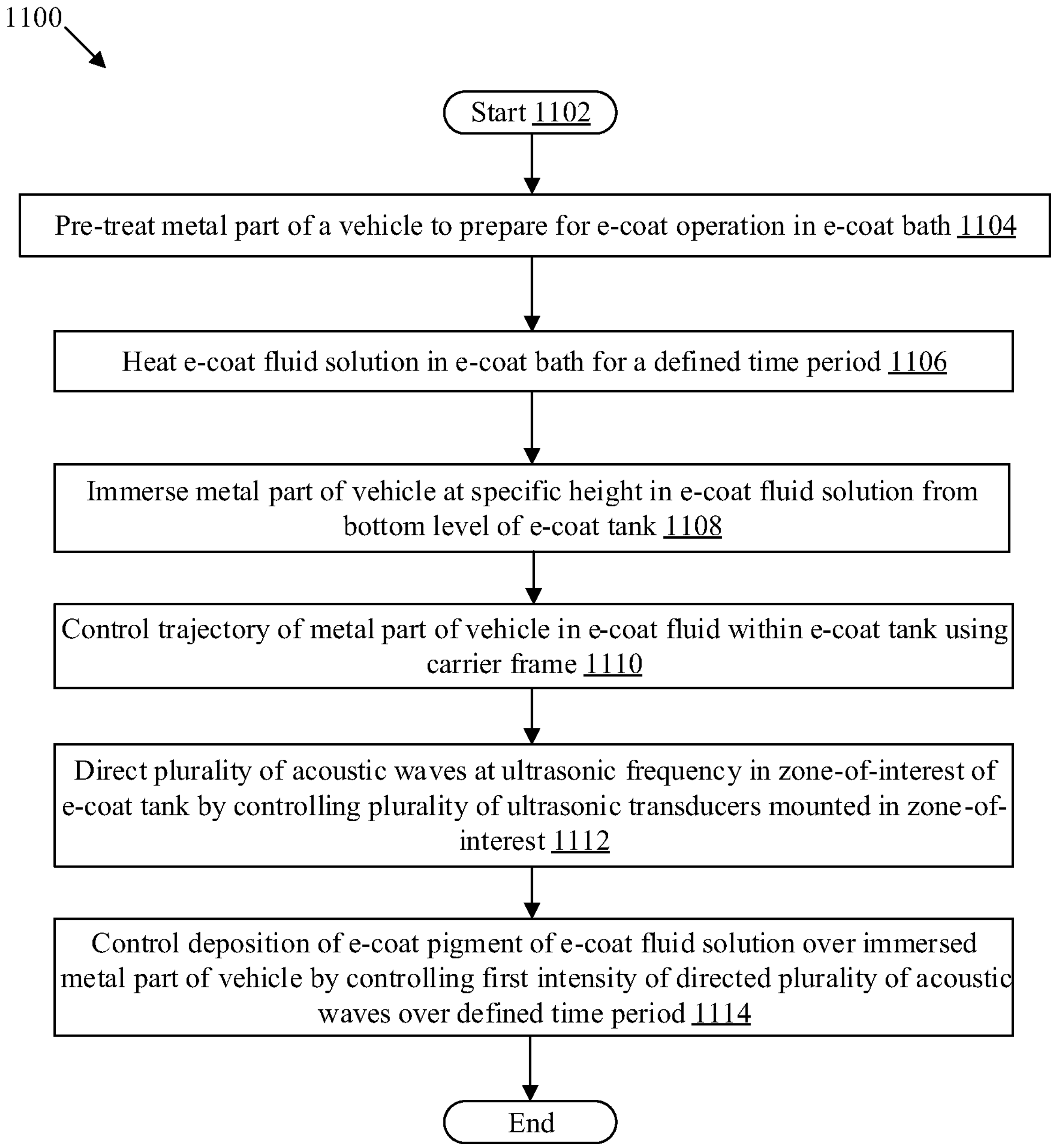
FIG. 11 is a flowchart that illustrates an exemplary method for performing degasification of dissolved gases in an e-coat fluid solution and e-coating on a metal part of a vehicle, in accordance with an embodiment of the disclosure.

FIG. 11 is a flowchart that illustrates an exemplary method for performing degasification of dissolved gases in an e-coat fluid solution and e-coating on a metal part of a vehicle, in accordance with an embodiment of the disclosure. With reference to FIG. 11, there is shown a flowchart 1100. The flowchart 1100 is described in conjunction with elements from FIGS. 1, 2, 3A, 3B, 3C, 4A, 4B, 4C, 5, 6, 7A, 7B, 8A, 8B, 9B, and 10. The method for performing degasification of dissolved gases in the e-coat fluid solution 114 and e-coating on the metal part 112 of a vehicle, begins at 1102 and proceeds to 1104.

At 1104, the metal part 112 of the vehicle may be pre-treated to prepare for an e-coat process in the e-coat tank 104. For example, the metal part 112 of the vehicle may be cleaned, followed by acid-etching and rinsing before the e-coat process to obtain a cleaner reaction surface on the metal part 112. The cleaner reaction surface facilitates an efficient deposition of a coating layer of the e-coat pigment on the metal part 112 during e-coat process.

At 1106, the e-coat fluid solution 114 in the e-coat tank 104 may be heated over the defined time period. The heating system 208 may be configured to heat the e-coat fluid solution 114 in the e-coat tank 104 for the defined time period such that a temperature of the e-coat fluid solution 114 is between a specified temperature range, such as "70° F. to 95° F.". In some embodiments, the e-coat fluid solution 114 in the e-coat tank 104 may be heated periodically to raise a defined level of temperature of the e-coat fluid solution 114 over a certain duration. The temperature within the e-coat tank 104 may be continuously monitored using the temperature sensor 206. In cases where the temperature within the e-coat tank 104 is beyond a specified temperature threshold, a temperature alarm may be raised and the cooling system 210 may be activated to cool down the e-coat fluid solution 114 within the e-coat tank 104.

At 1108, the metal part 112 of the vehicle may be immersed at the specific height in the e-coat fluid solution 114 from a bottom level of the e-coat tank 104. At 1110, the trajectory of the metal part 112 may be controlled in the e-coat fluid solution 114, using the carrier frame 110.

At 1112, a plurality of acoustic waves may be directed at the ultrasonic frequency in the zone-of-interest 116 of the e-coat tank 104 by controlling the plurality of ultrasonic transducers 108 mounted in the zone-of-interest 116. The first amount of dissolved gases in the e-coat fluid solution 114 may be reduced or removed as bubbles from a surface of the e-coat fluid solution 114 based on the directed plurality of acoustic waves. It may be observed that at the time of application of the plurality of acoustic waves, large bubble islands may be dispersed on the surface of the e-coat fluid solution 114. In some cases, small bubbles may coalesce to form larger bubbles and sufficiently large bubbles may rupture on the surface of the e-coat fluid solution 114.

At 1114, the deposition of the e-coat pigment of the e-coat fluid solution 114 may be controlled over the immersed metal part 112 of the vehicle by controlling the first intensity of the plurality of acoustic waves over the defined time period. Also, the first intensity of the directed plurality of acoustic waves may be controlled over a defined time period to accelerate a dispersion (or de-agglomeration) of the e-coat pigment present in the e-coat fluid solution 114. Control passes to end.

In a conventional e-coating process, the e-coat operation may be followed by a recovery operation of e-coat materials, such as the e-coat pigment and/or resin, in the e-coat fluid solution 114. Typically, mechanical agitators may be used to disperse the e-coat pigment. In case of the coating system 102, as a result of the increase of the first intensity of the directed plurality of acoustic waves over a defined time period to accelerate the dispersion of the e-coat pigment present in the e-coat fluid solution 114, there is no deposition of residue at the bottom of the e-coat tank 104. Rather, the e-coat pigment is dispersed by the plurality of ultrasonic transducers 108 even in the absence of any mechanical agitators. The recovery process of the e-coat solids is fast compared to the conventional e-coating process, and the inner surfaces of the e-coat tank 104 remains clean. Thus, an additional time-consuming cleaning step is not required. In some embodiments, a curing of the coating layer may be performed. The curing time and temperature may vary based on the type of e-coat pigment and resin used in the e-coat fluid solution 114, size, and geometry of the metal part 112 of the vehicle that is to be e-coated.

In a conventional e-coat process, an e-coat pigment may be deposited on a metal part (such as the entire vehicle body, the hood, or a side fender) of the vehicle, without an application of acoustic energy in a conventional e-coat fluid solution that includes the dissolved gases. It may be noted that the deposition of e-coat pigment on the metal part using the conventional e-coating process may result in one or more coating defects. The e-coated metal part may be susceptible to coating defects around corners, hard-to-reach areas, or other areas on the surface of the metal part. Such one or more coating defects may occur due to agglomeration of e-coat materials, such as e-coat pigment, in the e-coat fluid solution and dissolved gases in the e-coat fluid solution. This may also lead to a non-uniform coating layer, especially in areas that may have less surface area exposed directly to the e-coat fluid solution. The one or more coating defects may exhibit almost negligible or a thin layer of e-coat pigment that may be susceptible to damage and may wear off in subsequent manufacturing or quality test stages.

On the contrary, in the disclosed e-coat process, the application of the plurality of acoustic waves at the controlled first intensity and the ultrasonic frequency causes a uniform and accelerated deposition of the e-coat pigment in the e-coat fluid solution 114 across the surface of the metal part 112 of the vehicle. On the metal part 112, there may be no coating defects. Such absence of coating defects may help to resist corrosion or other chemical or physical damages to the metal part 112 of the vehicle. Also, the body paint may adhere efficiently with the metal part 112 due to absence of coating defects, which otherwise may cause the body paint to wear out over a specific usage or test time period. In some cases, the surface of the metal part 112 may be inverted to have the surface placed concave relative to a surface of the plurality of ultrasonic transducers 108.

Various embodiments of the disclosure provide a coating system (such as the coating system 102). The coating system may include an electro-coat (e-coat) tank (such as the e-coat tank 104) that stores an e-coat fluid solution (such as the e-coat fluid solution 114) having a first amount of dissolved gases and a plurality of ultrasonic transducers (such as the plurality of ultrasonic transducers 108) mounted in a zone-of-interest (such as the zone-of-interest 116) of the e-coat tank. In accordance with an embodiment, at least one of the dissolved gases in the e-coat fluid solution is hydrogen gas (H2). The coating system may further include control circuitry (such as the control circuitry 216). The control circuitry may be configured to control the plurality of ultrasonic transducers to direct a plurality of acoustic waves at an ultrasonic frequency in the zone-of-interest of the e-coat tank. The directed plurality of acoustic waves at the ultrasonic frequency may cause a controlled degasification of the first amount of the dissolved gases from a volume of the e-coat fluid solution. The volume of the e-coat fluid solution may correspond to the zone-of-interest. The control circuitry may be further configured to control a first intensity of the directed plurality of acoustic waves over a defined time period for a control over a deposition of an e-coat pigment of the e-coat fluid solution over a metal part (such as the metal part 112) of a vehicle. The metal part may be immersed in the e-coat fluid solution at a specific height from a bottom level of the e-coat tank.

In accordance with an embodiment, the plurality of ultrasonic transducers may be mounted to a bottom portion of the e-coat tank and within the zone-of-interest. The plurality of ultrasonic transducers may be in the zone-of-interest such that the plurality of acoustic waves are directed uniformly in different directions throughout the volume of the e-coat fluid solution in the zone-of-interest.

In accordance with an embodiment, the plurality of ultrasonic transducers may include at least one push-pull ultrasonic transducer. The plurality of ultrasonic transducers may include a first set of ultrasonic transducers (such as the first set of ultrasonic transducers 312) and a second set of ultrasonic transducers (such as the second set of ultrasonic transducers 314). The first set of ultrasonic transducers and the second set of ultrasonic transducers may be mounted on a bottom portion (such as the bottom portion 310) of the e-coat tank in the zone-of-interest such that a first position of the first set of ultrasonic transducers staggers from a second position of the second set of ultrasonic transducers. The first position may stagger from the second position for an inhibition of at least one dead fluid zone in the zone-of-interest.

In accordance with an embodiment, the coating system may further include a carrier frame (such as the carrier frame 110). The metal part may be mounted on the carrier frame. The control circuitry may be further configured to control a defined trajectory (such as the defined trajectory 412) of the metal part through the e-coat fluid solution within the e-coat tank. The control circuitry may be further configured to control the carrier frame to guide the metal part across a length of the e-coat tank in accordance with the defined trajectory.

In accordance with an embodiment, the control circuitry may be further configured to control at least the first intensity or the ultrasonic frequency of the directed plurality of acoustic waves over the defined time period to cause a dispersion or a de-agglomeration of the e-coat pigment in the e-coat fluid solution. At least the first intensity or the ultrasonic frequency of the directed plurality of acoustic waves may be controlled such that particles of the e-coat pigment unstick to walls of the e-coat tank.

In accordance with an embodiment, the control of the first intensity of the acoustic waves corresponds to a rate of a removal of the first amount of the dissolved gases from the e-coat fluid solution of the e-coat tank. The first intensity may correspond to an acoustic intensity of the plurality of acoustic waves in the e-coat fluid solution.

In accordance with an embodiment, the control circuitry may be further configured to control an orientation of the metal part in the e-coat fluid solution. The orientation may be controlled to cause a change in an angle of incidence of the plurality of acoustic waves on a surface of the metal part. The change in the angle of incidence may cause a change in an acoustic pressure on the surface of the metal part. The acoustic pressure may correspond to the controlled first intensity of the directed plurality of acoustic waves.

In accordance with an embodiment, the deposition of the e-coat pigment on the metal part may be based an acoustic range of each ultrasonic transducer of the plurality of ultrasonic transducers from the metal part. The acoustic range may correspond to the specific height of the metal part from the bottom level of the e-coat tank.

In accordance with an embodiment, the coating system may further include a non-immersible ultrasound transducer (such as the non-immersible ultrasonic transducer 222) that may include a radiating plate (such as the radiating plate 616). The control circuitry may be further configured to control the non-immersible ultrasound transducer to direct an acoustic wave from the radiating plate to rupture a plurality of semi-immersed bubbles within a coating layer (such as the coating layer 604) of the e-coat pigment on the metal part of the vehicle. The radiating plate of the non-immersible ultrasound transducer may be parallel to a surface of the metal part.

Various embodiments of the disclosure may be found in a method for performing degasification of dissolved gases in an e-coat fluid solution and e-coating on a metal part of a vehicle. The method may include a step of immersing the metal part of the vehicle at a specific height in the e-coat fluid solution from a bottom level of an e-coat tank. The method may include another step of directing a plurality of acoustic waves at an ultrasonic frequency in a zone-of-interest of the e-coat tank by controlling a plurality of ultrasonic transducers mounted in the zone-of-interest. The directed plurality of acoustic waves at the ultrasonic frequency may cause a controlled degasification of a first amount of dissolved gases from a volume of the e-coat fluid solution. The volume of the e-coat fluid solution may correspond to the zone-of-interest. The may further include another step of controlling a deposition of an e-coat pigment of the e-coat fluid solution over the immersed metal part of the vehicle by controlling a first intensity of the directed plurality of acoustic waves over a defined time period.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and Bis false (or not present), A is false (or not present) and Bis true (or present), and both A and Bis true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method for electrocoating a metal part, comprising:

immersing a metal part in an electrocoating fluid solution positioned in an electrocoating tank, wherein the electrocoating fluid solution comprises dissolved gases;

directing a plurality of omnidirectional acoustic waves at an ultrasonic frequency uniformly throughout a volume of the electrocoating fluid solution in a zone of the electrocoating tank, wherein the directed plurality of omnidirectional acoustic waves generate cyclic positive and negative pressure waves that cause a controlled degasification of the dissolved gases from the volume of the electrocoating fluid solution that corresponds to the zone, wherein the plurality of omnidirectional acoustic waves are directed through a plurality of ultrasonic transducers positioned in the zone of the electrocoating tank, wherein the plurality of ultrasonic transducers comprises a first plurality of ultrasonic transducers located in a first region of the zone and a second plurality of ultrasonic transducers located in a second region of the zone, wherein the first region is spaced apart from the second region, and wherein the first plurality of ultrasonic transducers are staggered from or aligned with the second plurality of ultrasonic transducers; and controlling a first intensity of the directed plurality of omnidirectional acoustic waves over a defined time period to accelerate or promote dispersion of an electrocoating pigment and thereby control deposition of the electrocoating pigment over the metal part immersed in the electrocoating fluid solution.

2. The method of claim 1, wherein the first region is spaced apart from the second region of the zone.

3. The method of claim 1, wherein the deposition of the electrocoating pigment on the metal part is based an acoustic range of each ultrasonic transducer of the plurality of ultrasonic transducers from the metal part.

4. The method of claim 1, wherein the plurality of ultrasonic transducers are positioned on a bottom portion of the electrocoating tank.

5. The method of claim 1, wherein an acoustic range of each ultrasonic transducer of the plurality of ultrasonic transducers from the metal part corresponds to a specific height of the metal part from a bottom level of the electrocoating tank.

6. The method of claim 5, wherein the specific height from a bottom level of the electrocoating tank is about 800 mm.

7. The method of claim 1, further comprising controlling a trajectory of the metal part through the electrocoating fluid solution within the electrocoating tank.

8. The method of claim 7, wherein controlling the trajectory of the metal part comprises guiding the metal part across a length of the electrocoating tank, wherein the metal part is attached to a carrier frame.

9. The method of claim 7, wherein controlling the trajectory of the metal part comprises controlling an orientation of the metal part in the electrocoating fluid solution, wherein the orientation is controlled to cause a change in an angle of incidence of the plurality of omnidirectional acoustic waves on a surface of the metal part.

10. The method of claim 1, wherein controlling the first intensity of the directed plurality of omnidirectional acoustic waves corresponds to a rate of a removal of an amount of the dissolved gases from the-electrocoating fluid solution of the electrocoating tank.

11. The method of claim 1, wherein directing the plurality of omnidirectional acoustic waves at the ultrasonic frequency further causes de-agglomeration of the electrocoating pigment in the electrocoating fluid solution.

12. The method of claim 1, wherein directing the plurality of omnidirectional acoustic waves at the ultrasonic frequency further causes a plurality of semi-immersed bubbles within a coating layer of the electrocoating pigment on the metal part to rupture.

13. The method of claim 1, wherein the dissolved gases comprise hydrogen gas ($H_2$).

14. The method of claim 1, wherein the ultrasonic frequency of the plurality of omnidirectional acoustic waves is 20 KHz to 50 KHz.

15. The method of claim 1, wherein the plurality of omnidirectional acoustic waves are directed at a power of 10 watts/gallon to 100 watts/gallon.

16. The method of claim 1, wherein the metal part is a vehicle metal part.

* * * * *